United States Patent

Masashi

[19]

[11] Patent Number: 5,898,690
[45] Date of Patent: Apr. 27, 1999

[54] WIRELESS COMMUNICATION EQUIPMENT AND COMMUNICATION SYSTEM HAVING AUTOMATIC SWITCHING CAPABILITY BETWEEN RELAYED TRANSMISSION/ DIRECT TRANSMISSION

[75] Inventor: Oda Masashi, Kyoto, Japan

[73] Assignee: Sharp Kabushiki Kaisha, Osaka, Japan

[21] Appl. No.: 08/665,205

[22] Filed: Jun. 14, 1996

[30] Foreign Application Priority Data

Jun. 15, 1995 [JP] Japan .................................. 7-148779

[51] Int. Cl.⁶ .............................. H04L 12/28; H04L 12/56
[52] U.S. Cl. ............................................................ 370/401
[58] Field of Search ..................................... 370/315, 400, 370/401, 402, 403, 335, 338, 342, 349, 310, 441, 328; 455/11.1, 422

[56] References Cited

U.S. PATENT DOCUMENTS

| | | | |
|---|---|---|---|
| 4,627,052 | 12/1986 | Hoare et al. ............................. | 370/402 |
| 4,947,340 | 8/1990 | Sheehy ..................................... | 370/401 |
| 5,329,531 | 7/1994 | Diepstruten et al. .................... | 370/338 |
| 5,504,746 | 4/1996 | Meier ....................................... | 370/338 |

FOREIGN PATENT DOCUMENTS 5-300069  12/1993  Japan .

Primary Examiner—Ajit Patel
Attorney, Agent, or Firm—David G. Conlin; William J. Daley, Jr.

[57] ABSTRACT

A wireless communication equipment includes a transmission destination information managing unit for managing transmission destination information specifying a respective actual transmission destinations when transmitting to other wireless communication equipments, and a transmitting/receiving unit for transmitting/receiving information for an associated application and information for managing switching between direct transmission and relayed transmission with other wireless communication equipments, to and from other wireless communication equipments based on the transmission destination information. Transmission destination information managing unit manages transmission destination information dynamically, in cooperation with the transmitting/receiving unit. The transmission destination information is updated to perform direct transmission and relayed transmission when direct transmission is possible and impossible, respectively. Each wireless communication equipment determines process to be performed in accordance with identification codes indicating transmission destination and transmission source of data, transmission destination and transmission source of a signal or a packet as well as other information, and relays the signal if necessary.

44 Claims, 19 Drawing Sheets

FIG.5

| | | | | | | | |
|---|---|---|---|---|---|---|---|
| P1 | GENERAL DATA | ID-A | ID-E | ID-A | ID-E | 101 | DATA1 |
| P2 | RECEPTION RESPONSE | ID-E | ID-A | ID-E | ID-A | 85 | 101 |
| P3 | GENERAL DATA | ID-A | ID-E | ID-A | ID-E | 102 | DATA2 |
| P4 | GENERAL DATA | ID-A | ID-E | ID-A | ID-E | 103 | DATA2 | 102 |
| P5 | GENERAL DATA | ID-A | ID-E | ID-A | ID-E | 106 | DATA2 | 102 |
| P6 | INQUIRY | ID-A | ID-X | ID-A | ID-X | 107 | ID-E |
| P7 | ANSWER | ID-B | ID-A | ID-B | ID-A | 205 | ID-E |
| P8 | GENERAL DATA | ID-A | ID-B | ID-A | ID-E | 108 | DATA2 | 102 |
| P9 | GENERAL DATA | ID-B | ID-E | ID-A | ID-E | 206 | DATA2 | 102 108 |
| P10 | RECEPTION RESPONSE | ID-E | ID-A | ID-E | ID-A | 86 | 108 |
| P11 | GENERAL DATA | ID-A | ID-B | ID-A | ID-E | 109 | DATA3 |
| P12 | GENERAL DATA | ID-B | ID-E | ID-A | ID-E | 207 | DATA3 | 109 |
| P13 | RECEPTION RESPONSE | ID-E | ID-A | ID-E | ID-A | 87 | 109 |

FIG.6

| | | | | | | | | |
|---|---|---|---|---|---|---|---|---|
| P14 | GENERAL DATA | ID-A | ID-B | ID-A | ID-E | 111 | DATA4 | |
| P15 | GENERAL DATA | ID-B | ID-E | ID-A | ID-E | 209 | DATA4 | 111 |
| P16 | RECEPTION RESPONSE | ID-E | ID-A | ID-E | ID-A | 89 | 111 | |
| P17 | GENERAL DATA | ID-A | ID-B | ID-A | ID-E | 113 | DATA5 | |
| P18 | GENERAL DATA | ID-B | ID-E | ID-A | ID-E | 211 | DATA5 | 113 |
| P19 | RECEPTION RESPONSE | ID-E | ID-A | ID-E | ID-A | 91 | 113 | |
| P20 | RELAY CANCELLING | ID-E | ID-A | ID-E | ID-A | 92 | | |
| P21 | GENERAL DATA | ID-A | ID-E | ID-A | ID-E | 114 | DATA6 | |
| P22 | RECEPTION RESPONSE | ID-E | ID-A | ID-E | ID-A | 93 | 114 | |

FIG.7

| | | | | | | | | |
|---|---|---|---|---|---|---|---|---|
| P31 | GENERAL DATA | ID-A | ID-C | ID-A | ID-C | 150 | DATA7 | |
| P32 | RECEPTION RESPONSE | ID-C | ID-B | ID-C | ID-A | 301 | 150 | |
| P33 | RECEPTION RESPONSE | ID-B | ID-A | ID-C | ID-A | 230 | 150 | 301 | ság
WIRELESS COMMUNICATION EQUIPMENT AND COMMUNICATION SYSTEM HAVING AUTOMATIC SWITCHING CAPABILITY BETWEEN RELAYED TRANSMISSION/ DIRECT TRANSMISSION

BACKGROUND OF THE INVENTION

1. Field of the Invention

The present invention relates to a communication system for wireless data transmission/reception and to a wireless communication equipment used in such a system. More specifically, the present invention relates to a communication system and wireless communication equipments which allow automatic switching between direct transmission and relayed transmission in which data is transmitted from a transmission source equipment to a transmission destination equipment through a relay.

2. Description of the Background Art

Recently, much effort has been made to substitute wireless medium such as radio wave, infrared wave or ultrasonic wave for wired medium such as a coaxial cable or a twisted pair as the communication medium, in order to facilitate moving and layout of electronic equipments such as personal computers connected to LAN (Local Area Network). At present, wireless LAN products such as boards for personal computers have come to be commercially available.

Further, as portable terminals such as a so called electronic organizer have been improved to have wider variety of functions, portable terminals having communication function have been produced. At present, one to one communication is dominant in the field of wireless communication between portable terminals. However, N to N communication employing a wireless network including three or more portable terminals has been developed.

Data transmitted/received between the terminals are transmitted in the form of packets. FIG. 1 shows configuration of a packet 30 used in a conventional communication system. When wireless communication takes place between three or more communication equipments, the packet transmitted by the transmission source equipment is received not only by the transmission destination equipment but also by other communication equipments. Therefore, it is necessary to make clear from which communication equipment to which communication equipment the data is transmitted. For this purpose, packet 30 includes, in addition to the transmission data 38, an identification code 34 indicating transmission source equipment of the data, and an identification code 36 indicative of the transmission destination equipment of the data. Packet 30 further includes a packet type code 32 indicating the type of the packet, and other information 40. The communication equipment which has received the packet determines, depending on whether the data transmission destination identification code of the received packet matches the identification code of itself, whether the data is destined to it. The communication equipment which has received the data destined to it transmits a reception response packet to the transmission source equipment, so as to notify that the data has been received.

A conventional wireless communication system allows communication where direct communication between each of the equipment is possible. The conventional technique does not allow direct wireless communication between equipments between which wireless signals do not directly reach. In order to cope with this problem, the conventional wireless communication system further includes a wired network having a plurality of access points. In such a system, wireless communication is established between a terminal and an access point, and wired communication is established between each of the access points. Such a communication network presumes and is suitable for an environment in which terminals are stationary or terminals move only within a small range. Therefore, communication between terminals in the network is always possible after the operation of the network is confirmed when the terminals are set. Accordingly, arrangement of wire medium can be minimized.

However, there arises a new problem when terminals moving in a wide range such as portable terminals are to be used. More specifically, the portable terminal moves with the user, and hence the distance between the terminal and an access point vary widely. A condition where wireless communication between the terminal and the access point becomes impossible is more likely. Wireless direct communication between portable terminals without using a wire medium is possible. However, it is highly likely that the communication between portable terminals which has been successful so far suddenly becomes impossible if position of a terminal with respect to another terminal changes.

Routing technique used in the Internet has been known as a technique for establishing communication between terminals incapable of direct communication, through other equipments. However, the routing technique, which was originally developed for a wired network, cannot be applied as it is to a wireless network where state of connection with each terminal to the network may vary. Further, the routing technique requires its relaying equipment of high performance. Therefore, structures of the equipments constituting the network cannot be simplified.

The packet configuration shown in FIG. 1 may be utilized when relayed transmission is to be performed with a relay equipment determined in advance. However, as a relay equipment is fixed, the conventional packet configuration is not suitable for wireless communication network constituted by portable terminals in which condition allowing direct transmission tends to change considerably. When direct transmission from a transmission source equipment to a transmission destination equipment is not possible and relayed transmission through a relay equipment is desired, relayed transmission is not possible either, if direct transmission from the transmission source equipment to the relay equipment or direct transmission from the relay equipment to the transmission destination equipment is impossible.

SUMMARY OF THE INVENTION

Therefore, an object of the present invention is to provide a wireless communication system and wireless communication equipments which allow highly reliable and efficient communication in a wireless communication system in which possibility of direct transmission is highly susceptible to changes.

Another object of the present invention is to provide a wireless communication system and wireless communication equipments which allow highly reliable and efficient communication between wireless communication equipments between which direct data transmission becomes impossible, in a wireless communication system in which possibility of direct transmission is highly susceptible changes.

A still further object of the present invention is to provide, in a wireless communication system in which possibility of direct transmission is highly susceptible to changes, a wireless communication system and wireless communication equipments which allow highly reliable and efficient communication by the function of finding a wireless communication equipment relaying data transmission to that wireless communication equipment to which direct data transmission becomes impossible.

An additional object of the present invention is to provide, in a wireless communication system in which possibility of direct transmission is highly susceptible to changes, a wireless communication equipment having a function of relaying, when direct communication of other wireless communication equipments between each other becomes impossible, communication between the said wireless communication equipments.

A further object of the present invention is to provide, in a wireless communication system in which possibility of direct transmission is highly susceptible to changes, a wireless communication equipment which has a function of, when it is communicating with another wireless communication equipment relayed by a further wireless communication equipment and direct communication with said wireless communication equipment becomes possible, cancelling relayed communication with said another wireless communication equipment and resuming direct communication, and to provide such a wireless communication system.

The wireless communication system in accordance with the present invention includes a plurality of wireless communication equipments. Each of the plurality of wireless communication equipments communicate with the plurality of wireless communication equipments to and from each other in wireless manner, for respective associated applications. Direct communication between any two of the plurality of wireless communication equipments may become impossible because of movement of a wireless communication equipment. Each of the plurality of wireless communication equipments includes a communication managing unit for managing transmission destination information specifying a first transmission destination wireless communication equipment when communication with other wireless communication equipments is to be performed; and a transmission unit and a reception unit for transmitting and receiving to and from other wireless communication equipments, information for the application and information for managing switching between direct communication and indirect communication with other wireless communication equipments, based on the transmission destination information managed by said communication managing unit. The communication managing unit dynamically manages the transmission destination information, in cooperation with the transmission and reception units. The transmission and reception units may perform communication in the form of packets.

Preferably, unique identification codes are assigned to the plurality of wireless communication equipments in advance. The communication managing unit includes a transmission destination table holding, in the form of a table, identification codes of other wireless communication equipments and identification codes of direct transmission destination wireless communication equipment when information is to be transmitted to respective other wireless communication equipments; and an updating unit for dynamically updating the identification code of the direct transmission destination wireless communication equipment in the transmission destination table based on information for managing switching between direct communication and indirect communication with other wireless communication equipments provided from the transmission and reception units.

The transmission and reception units may include a transmission unit for transmitting signals with reference to a table; a reception unit; a first detecting unit for detecting direct communication with a specific wireless communication equipment using the transmission and reception units being impossible; and an inquiry signal transmitting unit responsive to the first detecting unit for transmitting an inquiry signal with respect to the specific wireless communication equipment to other wireless communication equipments. Said other wireless communication equipments have a function responsive to the inquiry signal for transmitting an answer signal to the wireless communication equipment when direct communication with the specific wireless communication equipment is possible. The transmission and reception units further include a unit, responsive to the answer signal for applying an identification code of the transmission source of the answer signal to the managing unit, and the updating unit updates the identification code of the direct transmission source in the table with the identification code of the transmission source of the answer signal when information is to be transmitted to the specific wireless communication equipment. The transmission and reception unit may transmit, when a signal to the wireless communication equipment is received by another wireless communication equipment, a reception response signal to said another wireless communication equipment by using the transmission unit. The first detecting unit determines, when a reception response signal from that wireless communication equipment to which a signal has been directly transmitted by using the transmission unit is not received by the reception unit within a prescribed time period, that direct transmission of the signal by the transmission unit becomes impossible.

The transmission and reception units further include a determining unit, responsive to reception of an inquiry signal with respect to a specific wireless communication equipment from other wireless communication equipments, for determining with reference to a table whether or not direct communication to the specific wireless communication equipment is possible, and an answering unit for transmitting, when it is determined that the direct communication is possible, an answer signal to the received inquiry signal to other wireless communication equipments. The inquiry signal with respect to the specific wireless communication equipment may include an identification code indicating that the signal is an inquiry signal, an identification code of the specific wireless communication equipment, and an identification code of the wireless communication equipment which transmitted the inquiry signal. The determining unit includes a unit responsive to the inquiry signal for looking up the identification code of the direct transmission destination corresponding to the identification code of the specific wireless communication equipment, and determines whether the identification code specifying the direct transmission destination looked up by the look up unit matches the identification code of the specific wireless communication equipment.

The signal transmitted between the plurality of wireless communication equipments may include data, a data transmission source identification code, a data transmission destination identification code, a signal transmission source identification code indicating last source of transmission of the signal, and a signal transmission destination identification code indicating direct transmission destination of the signal. The transmission unit transmits the identification code of the wireless communication equipment as the signal transmission source identification code of the signal to be transmitted, and looks up and transmits the identification code of the wireless communication equipment corresponding to the data transmission destination identification code from the table, as the signal transmission destination identification code, the transmission unit further transmits the identification code of the transmission destination of the data as the data transmission destination identification code of the signal to be transmitted and the identification code of the wireless communication equipment as the data transmission source identification code, for the signal generated in the wireless communication equipment.

Preferably, the transmission and reception units transfer, in response to reception of a signal having the identification code of the wireless communication equipment as the signal transmission destination identification code and an identification code different from the identification code of the wireless communication equipment as the data transmission destination identification code, from other wireless communication equipment, the received signal by using the transmission unit. The transmission and reception units further include a second detecting unit for detecting the fact that it becomes possible for the wireless communication equipment to directly receive the signal from a first other wireless communication equipment to be relayed by a second other wireless communication equipment, and a unit responsive to the second detecting unit for transmitting a relay cancelling signal with respect to the wireless communication equipment, to the first other wireless communication equipment.

The second detecting unit may include a unit for detecting reception of a signal which has an identification code of the second other wireless communication equipments as the signal transmission destination identification code and the identification code of the wireless communication equipment as the data transmission destination identification code. The transmission and reception units may further include a relay cancelling signal detecting unit responsive to reception of a relay cancelling signal with respect to other wireless communication equipments from other wireless communication equipments, for applying data transmission source identification code of the relay cancelling signal to the updating unit. Receiving the data transmission source identification code from the relay cancelling signal detecting unit, the updating unit updates the table such that the code of the direct signal transmission destination identification code with respect to the wireless communication equipment specified by the data transmission destination identification code of the relay cancelling signal will be the data transmission source identification code from the relay cancelling signal detecting unit.

More preferably, the transmission and reception units repeat transmission of the inquiry signal by the inquiry signal transmitting unit and direct transmission of the signal by the transmission unit, until an answer signal or reception response signal is received.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5 to 7 show packets transmitted/received in a system in accordance with one embodiment of the present invention.

DESCRIPTION OF THE PREFERRED EMBODIMENTS

The communication system and the wireless communication equipment of the present invention will be described in detail in the following. The communication system of the present invention is a network constituted by three or more arbitrary number of communication equipments, allowing wireless communication between each of the communication equipments. In order to identify the communication equipment, unique identification codes are assigned to respective communication equipments. Each communication equipment stores, in addition to the identification code of itself, identification codes of other communication equipments within the network. Radio wave, infrared ray or ultrasonic wave may be used as a carrier medium of the wireless signal.

The present communication system allows direct communication and relayed communication. In the direct communication, data is directly transmitted from a transmission source equipment to a transmission destination equipment. In the relayed communication, the data is directly transmitted first from the transmission source equipment to a relay, and thereafter from the relay to a transmission destination equipment. There may be two or more relays. The data is transmitted in the form of a packet, with other necessary information for communication added. The data transmission source equipment transmits the packet to the data transmission destination equipment in direct transmission and transmits the packet to the relay in the relayed transmission. How to determine the packet transmission destination will be described later. Though the system of the present invention is suitable for packet transmission, it is also applicable to communication systems using wireless communication other than the packet transmission.

Figure 1:
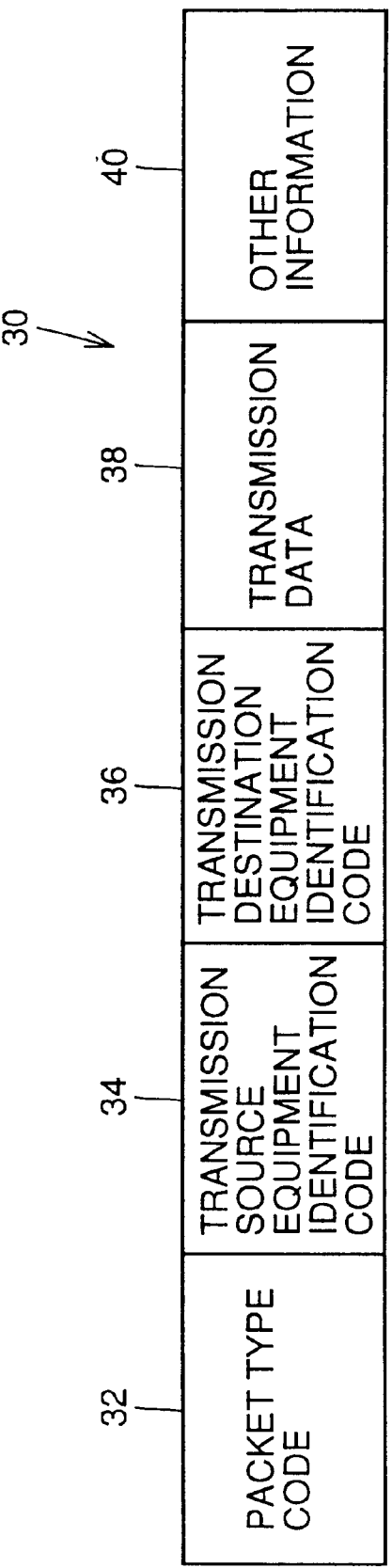
FIG. 1 shows a packet configuration used in a conventional communication system.
Figure 2:
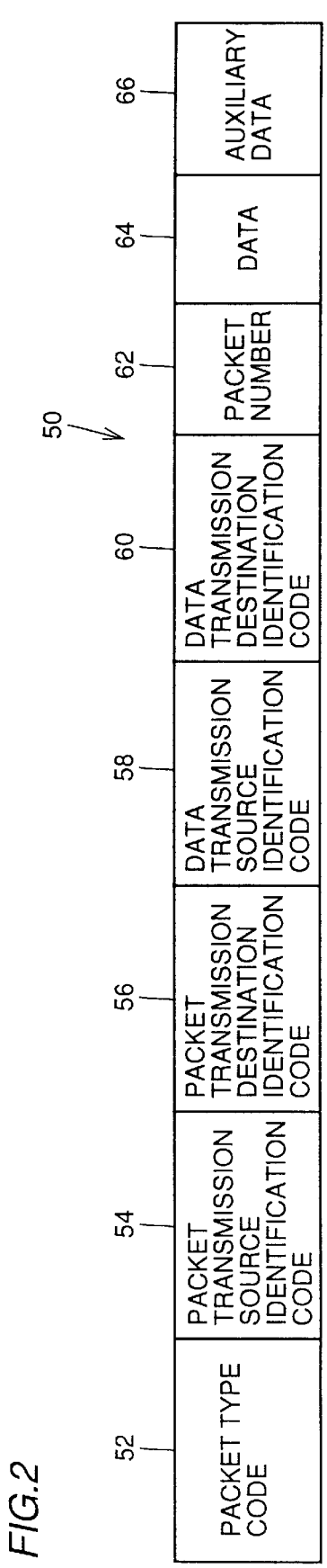
FIG. 2 shows a packet configuration used in the communication system in accordance with the present invention.

FIG. 2 shows a packet configuration used in the present system. A packet 50 includes data 64 to be transmitted, data transmission source identification code 58 indicating the wireless communication equipment which has prepared and transmitted the data (referred to as "data transmission source equipment"), a data transmission destination identification code 60 indicating the wireless communication equipment which is the destination of data transmission (referred to as "data transmission destination equipment" hereinafter), a packet transmission source identification code 54 indicating the wireless communication equipment which has prepared and transmitted the packet (referred to as "packet transmission source equipment"), and a packet transmission destination identification code 56 indicating the wireless communication equipment which is the destination of transmission of the packet (referred to as "packet transmission destination equipment" hereinafter).

The data transmitted is divided generally into special data related to the function of the communication system, and general data not related to the function of the communication system. There are several data related to the function of communication system including "reception response", "inquiry", "answer" and "relay cancellation", which will be described in greater detail. A packet type code 52 is added to each packet, corresponding to the type of the data.

Each communication equipment stores the number of packets it transmits, and transmits this serial number as a packet number 62, added to the packet. This serial number identifies the packet. Further, auxiliary data 66 may be added, as needed, to the packet 50.

The communication equipments within the network are all capable of functioning as a data transmission source equipment, a data transmission destination equipment and a relay. Path of relayed transmission is not predetermined but the path of relayed transmission is selected with the relay appropriately set in accordance with the state in the network. For this purpose, each communication equipment stores identification codes of other communication equipments as well as identification code of a direct transmission destination equipment of a packet when data is transmitted to the communication equipment, and updates the packet transmission destination identification code in accordance with the change in the state of the network. Packet type code 52, packet transmission source identification code 54, packet transmission destination identification code 56, data transmission source identification code 58, data transmission destination identification code 60 and packet number 62 are of fixed length, and which are positioned proceeding data 64 and constitute a header of the packet. FIG. 2 shows a mere example, and relative positions of these are not limited to the one shown in FIG. 2. Meanwhile, data 64 and auxiliary data 66 are of variable length. A packet which does not have one or both of data 64 and auxiliary data 66 is permitted. It goes without saying that the data and the auxiliary data may be of fixed lengths. In the following example, it is assumed that packet 50 having the configuration shown in FIG. 2 is transmitted/received between wireless communication equipments.

Figure 3:
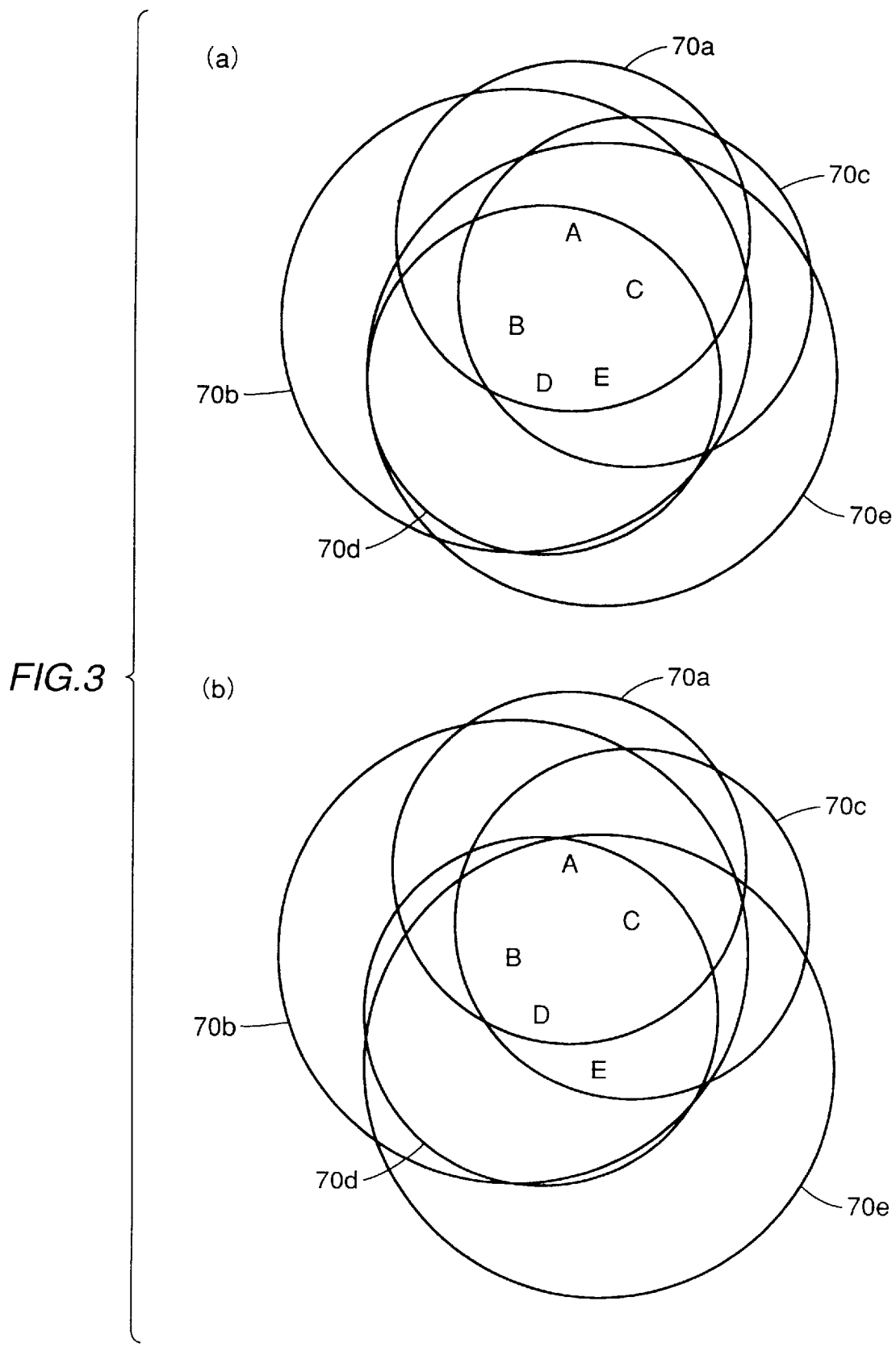
FIG. 3 shows change in relative positions of communication equipments in a wireless network.

Communication procedure in the system of the present invention will be described with reference to a specific example shown in FIG. 3. Structure of each wireless communication equipment of the present system will be described later. FIG. 3 shows a wireless network including five portable communication equipments A–E. Identification codes "ID-A"–"ID-E" are assigned to communication equipments A–E, respectively. Each of the communication equipments A–E is adapted to transmit the packet by radio wave and to receive the packet carried on the radio wave. Therefore, any of the communication equipments shown in FIG. 3 can transmit data to arbitrary communication equipment.

Referring to FIG. 3, circles 70a to 70e represent reach of radio outputs from communication equipments A–E, respectively. Here, the magnitudes of the outputs from respective communication equipments A–E are not the same, and reaches of the radio outputs differ. The magnitudes of wireless outputs of all the communication equipments in the network may be the same. Further, the reach of the wireless output is represented as a circle in FIG. 3. However, the reach of the wireless output is not necessarily a circle when there is an obstacle hindering progress of the radio wave, or when the wireless output has directivity.

In (a) of FIG. 3, communication equipments A–E are within the reaches of radio outputs from all other communication equipments, and hence data can be transmitted/received directly to and from any communication equipment, while (b) of FIG. 3 shows a state in which communication equipment A–E move, changing positional relation with each other. Here, the output from communication equipment A does not reach communication equipment E, and hence data cannot be directly transmitted from communication equipment A to communication equipment E. On the contrary, the wireless output from communication equipment E reaches communication equipment A, and hence direct data transmission from communication equipment E to communication equipment A is possible.

Figure 4:
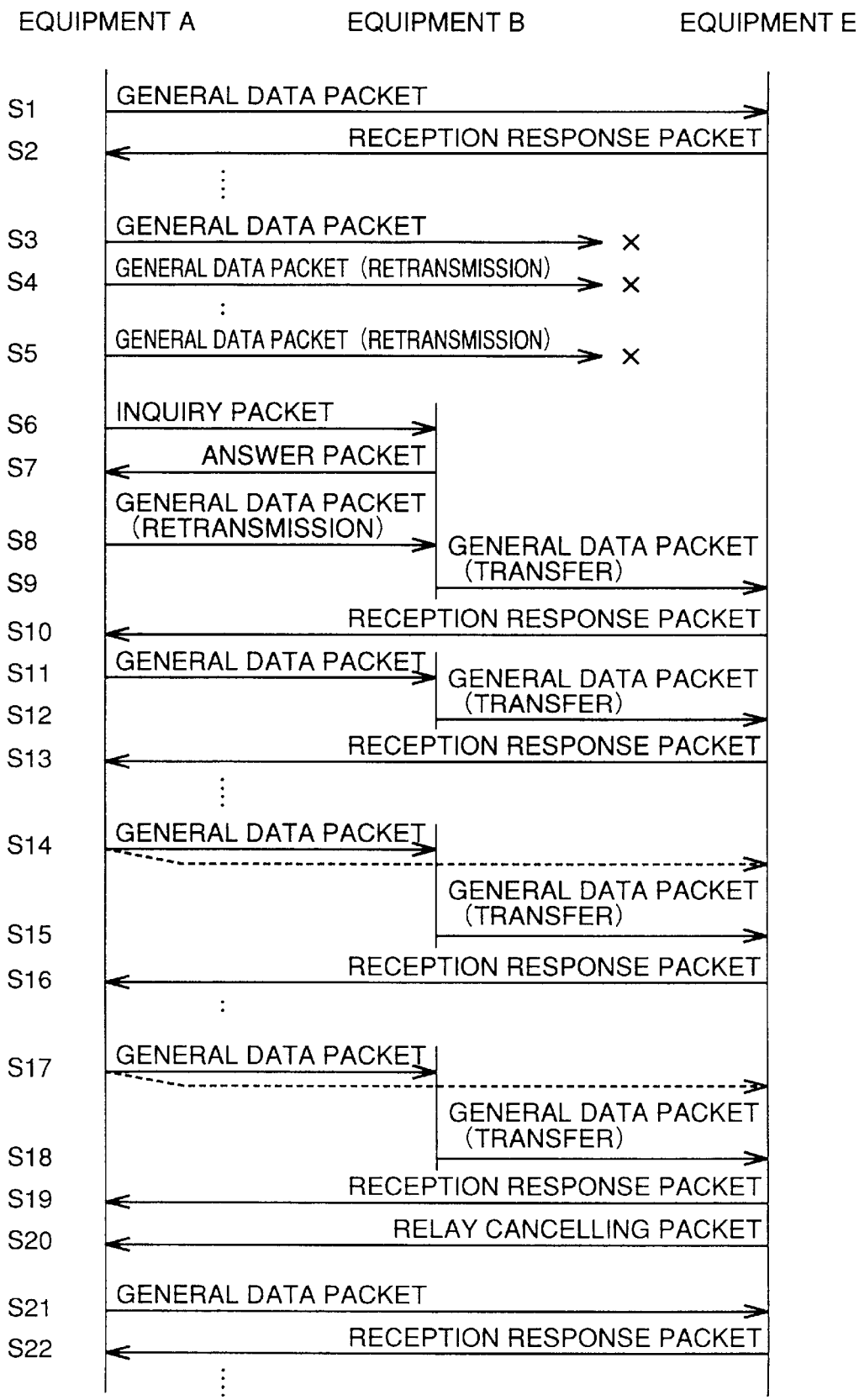
FIG. 4 shows packet transmission and reception in an embodiment of the present invention.

Let us consider data transmission from communication equipment A to communication equipment E when the data of the system changes from (a) to (b) and again returns to (a) of FIG. 3. FIG. 4 shows a procedure of communication processing in this example. In FIG. 4, an arrow represents a packet to be transmitted, and contents of the packet are as shown in FIGS. 5 and 6. Packets P1–P22 of FIGS. 5 and 6 correspond to the packet transmitted in steps S1 to S22 of FIG. 4.

When the system is in the state of (a) of FIG. 3 and communication equipment are all transmitting data directly to other communication equipments, information related to other communication equipments stored in communication equipment A, B and E are as shown in Tables 1, 2 and 3 below, respectively.

TABLE 1

Information of Other Equipments in Equipment A

| Equipment Name | Equipment Identification Code | Packet Transmission Destination Identification Code |
|---|---|---|
| B | ID-B | ID-B |
| C | ID-C | ID-C |
| D | ID-D | ID-D |
| E | ID-E | ID-E |

TABLE 2

Information of Other Equipments in Equipment B

| Equipment Name | Equipment Identification Code | Packet Transmission Destination Identification Code |
|---|---|---|
| A | ID-A | ID-A |
| C | ID-C | ID-C |
| D | ID-D | ID-D |
| E | ID-E | ID-E |

TABLE 3

Information of Other Equipments in Equipment E

| Equipment Name | Equipment Identification Code | Packet Transmission Destination Identification Code |
|---|---|---|
| A | ID-A | ID-A |
| B | ID-B | ID-B |
| C | ID-C | ID-C |
| D | ID-D | ID-D |

As shown in Table 1, communication equipment A stores identification codes "ID-B"–"ID-E" of communication equipments B–E, and stores "ID-B"–"ID-E" as packet transmission destination when data is to be transmitted to respective communication equipments. Communication equipments B and E also store packet transmission destination identification code and the like corresponding to respective communication equipments, by identification codes of other equipments, as shown in Tables 2 and 3, respectively. Though information stored in communication equipments C and D is not shown, it is similar to the information stored in communication equipments A, B and E.

When general data is transmitted by communication equipment A to communication equipment E in this state (FIG. 4, S1), the packet corresponds to packet P1 of FIG. 5. Referring to FIG. 5, communication equipment A is the data transmission source equipment, and therefore, the data transmission source identification code is "ID-A." Since communication equipment E is the data transmission destination equipment, the data transmission destination identification code is "ID-E." Since the packet transmission source equipment is communication equipment A, the packet transmission source identification code of the packet is "ID-A." From Table 1, the transmission destination identification code of the packet to communication equipment E is "ID-E", and therefore, the packet transmission destination identification code is "ID-E." The data transmitted is general data not related to the function of communication, and hence the packet type code is "general data." The auxiliary data is set to blank. Assume that the number of packets which communication equipment A has transmitted so far is 100, the packet number of packet P1 is 101. In FIG. 3 and other figures, packet types such as "general data," and "reception response" are labeled. However, actually, the packet type is stored as a code assigned in advance.

When communication equipment A transmits packet P1, the wireless output reaches communication equipments B–E, and received by all the communication equipments B–E. Each of the communication equipments B–E compares the packet transmission destination identification code of the received packet with the identification code of itself, and determines whether the received packet is destined to it. Further, each of the communication equipments B–E compares the data transmission destination identification code of packet P1 with the identification code of itself, and determines whether the data of packet P1 is destined to it. Each of the communication equipment B–D ignores packet P1, since packet P1 is neither the packet destined to it nor the data destined to it. Communication equipment E stores entire packet P1, since packet P1 is destined to it. Further, the data of packet P1 is the data transmitted to it, and hence the communication equipment processes the data. At this time, as communication equipment E refers to the packet type code of packet P1, it is found that general data is transmitted by packet P1. Generally, in data processing, auxiliary data may also be read. However, auxiliary data of packet P1 is blank, and hence it is not used.

Further, communication equipment E transmits a reception response packet, notifying reception of the data to communication equipment A (FIG. 4, S2). The reception response packet corresponds to packet P2 of FIG. 5. The data of reception response packet includes the serial number which has been attached to the received packet P1. Since communication equipment E prepares the data of reception response packet P2 and transmits the data to communication equipment A, the data transmission source identification code of packet P2 is "ID-E", and data transmission destination identification code is "ID-A." Since the transmission source of the reception response packet is the communication equipment E, the packet transmission source identification code is "ID-E." Packet transmission destination identification code is the packet transmission destination identification code to communication equipment A which is looked up in Table 3, which is "ID-A." The packet type code is set to a value which represents "reception response."

When communication equipment E transmits the reception response packet P2, packet P2 is received by communication equipments A–D. Communication equipments B–D ignore the received packet P2, since packet transmission destination identification code of packet P2 is not the identification code of them and the data transmission destination identification code is not the identification code of them. Communication equipment A stores packet P2, since packet P2 is destined to it. Further, since data transmission destination identification code of packet P2 is the identification code of it, communication equipment A recognizes that the packet P2 includes data destined to it. Further, communication equipment A recognizes that the packet P2 is a reception response from the packet type code, and reads the serial number from the data of the stored packet P2, so as to determine to which data of which packet transmitted by the communication equipment A the packet P2 is the reception response.

In this manner, the data transmission source equipment can detect reception of data by the data transmission destination equipment. A reception response packet to the reception response packet is not transmitted. The reception response packet is transmitted only when a packet of which packet type code is "general data" is received.

When relative positions of communication equipments A–E change and the state of the system changes from (a) to (b) of FIG. 3, wireless output from communication equipment A does not reach communication equipment E. Therefore, direct transmission from communication equipment E to communication equipment A becomes impossible. However, communication equipment A still maintains information of other equipments shown in Table 1, even when the state of the system changes.

Therefore, when communication equipment A transmits data to communication equipment E for the first time after the change in the state of the system, a packet similar to packet P1 of FIG. 5 is used (FIG. 4, S3). More specifically, communication equipment A transmits a packet P3 (FIG. 5) of which data transmission destination identification code and the packet transmission destination identification code are "ID-E," respectively, and the data transmission source identification code and the packet transmission source identification code are "ID-A," respectively. However, the packet P3 does not reach communication equipment E, and hence a reception response packet is never transmitted in response to the transmitted packet. Communication equipment A determines, when the corresponding reception response packet is not received within a prescribed time period after the transmission of packet P3, that the data was not received by communication equipment E.

At this time, it may be possible that direct communication failed temporarily by an appearance of an obstacle, and hence communication equipment A retransmits the transmitted data for a prescribed number of times (FIG. 4, S4–S5). The retransmitted packet P4 or P5 (FIG. 5) may be received by communication equipment E. When communication equipment E transmits the reception response packet and it is received by communication equipment A, communication equipment A determines that direct transmission can be continued. However, when the system is in the state shown in FIG. 3(b), neither packet P4 nor P5 will be received by communication equipment E. Here, when the data is retransmitted in the form of a packet, the packet number of the packet which first transmitted the data (hereinafter referred to as "first transmission packet number") is always written in the auxiliary data of the retransmitted packet. This is to prevent possible erroneous processing when the data transmission destination equipment receives the same data twice or more. The erroneous processing and the process for preventing it will be described later.

When the reception response signal is not received after the several retransmission of data, communication equipment A performs the following procedure. First, communication equipment A determines that it is not appropriate to have communication equipment E as the transmission destination of the packet to transmit data to communication equipment E, and it makes the packet transmission destination identification code with respect to communication equipment E in Table 1 blank. This means that temporarily, there is not the actual packet transmission destination of the data to be transmitted to communication equipment E.

Thereafter, communication equipment A broadcasts a packet to all the communication equipments in the network, asking whether direct transmission from the destined communication equipment to communication equipment E is possible (FIG. 4, S6). This packet is referred to as "inquiry packet" with respect to communication equipment E. The inquiry packet corresponds to packet P6 of FIG. 5. The data of packet P6 includes identification code "ID-E" of communication equipment E. The packet type code of packet P6 is set to "inquiry." The data transmission source identification code and packet transmission source identification code are set to identification code "ID-A" of communication equipment A. The data transmission destination identification code and the packet transmission destination identification code are set to "ID-X," which is defined in advance for broadcasting. The identification code "ID-X" for broadcasting is stored by all the communication equipments in the network. Every communication equipment regards the identification code "ID-X" included in the received packet as identical to the identification code of the communication equipment itself receiving the packet. For example, communication equipment B (of which identification code is "ID-B") regards identification code "ID-X" found in the received packet as "ID-B."

Referring to FIG. 3(b), the inquiry packet P6 transmitted by communication equipment A is received by communication equipments B, C and D which are within the reach of the wireless output from communication equipment A. Communication equipment B receiving inquiry packet P6 regards the packet transmission destination identification code "ID-X" of packet P6 as identical to its identification code "ID-B," and stores the inquiry packet P6. Further, since the data transmission destination identification code is "ID-X," communication equipment B determines that the inquiry packet P6 is an inquiry packet transmitted to it. Further, communication equipment B reads the identification code of the communication equipment from the data in the inquiry packet P6. Since "ID-E" is read in the data, it is understood that the inquiry packet inquires whether direct communication to communication equipment E is possible.

Therefore, communication equipment B determines whether or not direct transmission from itself to communication equipment E is possible based on the information of other equipments stored therein. At this time, communication equipment B holds such information of other equipments as shown in Table 2. As shown in Table 2, the packet transmission destination identification code of communication equipment B is the same as the identification code "ID-E" of communication equipment E. This means that direct transmission from communication equipment B to communication equipment E is possible, as will be described later. Therefore, communication equipment B determines that direct transmission from itself to communication equipment E is possible, and transmits a packet notifying this (FIG. 4, S7). A packet responsive to an inquiry packet with respect to a certain communication equipment for notifying that direct transmission from the communication equipment to said certain communication equipment is possible to the transmission source equipment of the inquiry packet is referred to as an "answer packet."

The answer packet corresponds to packet P7 of FIG. 5. The data of the answer packet includes the equipment identification code "ID-E" stored in the data of the received inquiry packet P6. The data transmission destination identification code of answer packet P7 is set to the identification code "ID-A" of the communication equipment A which has transmitted the inquiry packet P6. The data transmission source identification code and the packet transmission source identification code are both set to the identification code "ID-B" of itself. The packet transmission destination code is set to "ID-A" corresponding to communication equipment A, which is looked up in Table 2. The packet type code is set to "answer."

If the information of other equipments stored in communication equipment B has changed from that shown in Table 2, it may be possible that the packet transmission destination identification code with respect to communication equipment E is no longer "ID-E." In that case, communication equipment B determines that the direct transmission to communication equipment E is impossible and therefore it does not transmit the answer packet.

Communication equipments C and D operate in the same manner with respect to the inquiry packet P6. More specifically, communication equipments C and D transmit answer packet when it is determined that direct transmission to communication equipment E is possible, and do not transmit the answer packet when it is determined to be impossible.

Receiving the answer packet P7, communication equipment A recognizes that packet P7 is the packet transmitted to communication equipment A, since the packet transmission destination identification code of packet 7 matches the identification code of communication equipment A, and hence it stores the answer packet P7. Since the data transmission destination identification code of packet P7 matches the identification code of communication equipment A, communication equipment A recognizes that the data of packet P7 is the data destined to it. Further, communication equipment A recognizes that packet P7 is an answer packet to the inquiry packet, based on the type code of packet P7.

Thereafter, communication equipment A reads the equipment identification code from the data in packet P7, and determines which communication equipment the answer packet P7 specifies as the communication equipment to which direct transmission is possible. There may be cases where communication equipment A transmits inquiry packets associated with a plurality of communication equipments. In this manner, as the equipment identification code related to the inquiry packet is stored in the answer packet, communication equipment A can identify which is the answer to which inquiry packet. In the example shown in FIG. 5, "ID-E" is stored in the data of answer packet P7, therefore, it is understood that this is an answer indicating possibility of direct transmission to communication equipment E.

Further, communication equipment A finds from which communication equipment direct transmission to communication equipment E is possible based on the data transmission source identification code of the answer packet. The communication equipment which is capable of direct transmission to communication equipment E is not always one. Therefore, answer packets to the inquiry packet with respect to communication equipment E may be transmitted from two or more communication equipments. In such a case, the communication equipment which has transmitted the inquiry packet stores a prescribed number of communication equipments in the order of reception or all the communication equipments received, which are capable of relaying, to be ready in case data transmission in accordance with the procedure described in the following is unsuccessful.

In the present example, it is assumed that communication equipment A receives an answer packet from communication equipment B first. The data transmission source identification code of the answer packet P7 is set to "ID-B" and hence communication equipment A determines that data can be transmitted to communication equipment E, using communication equipment B as a relay.

Therefore, communication equipment A changes the direct packet transmission destination identification code corresponding to communication equipment E from blank to "ID-B" indicating communication equipment B, of the information of other equipments shown in Table 1. Table 4 shows the information of other equipments after the change. Information of other equipments held by other communication equipments is not changed. Therefore, it follows that the packet containing the data to be transmitted from communication equipment A to communication equipment E is once transmitted from communication equipment A to communication equipment B.

TABLE 4

Information of Other Equipments in Equipment A

| Equipment Name | Equipment Identification Code | Packet Transmission Destination Identification Code |
| --- | --- | --- |
| B | ID-B | ID-B |
| C | ID-C | ID-C |
| D | ID-D | ID-D |
| E | ID-E | ID-B |

Communication equipment A transmits the data of packet P5, which was directly transmitted in vain to communication equipment E last time and the reception response packet to which could not be obtained, as packet P8 of FIG. 5 again (FIG. 4, S8). The data transmission destination identification code of packet P8 is set to "ID-E." The data transmission source identification code and the packet transmission source identification code are both set to "ID-A." The packet transmission destination identification code is set to "ID-B" which is the packet transmission destination identification code corresponding to communication equipment E, looked up in Table 4. The packet type code is set to "general data." Since the data is retransmitted, the packet number of packet P3, which transmitted that data first, is stored in the auxiliary data. The packet number of the packet which transmitted the data first is referred to as "first transmission packet number."

When communication equipment A transmits packet P8 and the system is in the state in FIG. 3(b), packet P8 is received by communication equipments B, C and D. Communication equipments C and D ignore packet P8, since neither the packet transmission destination nor the data transmission destination of packet P8 match the identification code of it. Communication equipment B stores packet P8, since the packet transmission destination identification code of packet P8 matches the identification code of it.

Since the data transmission destination identification code of packet P8 is "ID-E" and it does not coincide with the identification code of communication equipment B, communication equipment B recognizes that the data of packet P8 is destined not to communication equipment B but to communication equipment E. Therefore, communication equipment B prepares and transmits a packet for transferring the received data to communication equipment E, without transmitting the reception response packet with respect to packet P8 (FIG. 4, S9). This packet corresponds to packet P9 of FIG. 5.

Referring to FIG. 5, the data transmission source identification code and the data transmission destination identification code of packet P9 are the same as the data transmission source identification code and the data transmission destination identification code of the received packet P8, that is, "ID-A" and "ID-E," respectively. The packet transmission source identification code is set to the identification code "ID-B" of communication equipment B. The direct packet transmission identification code for communication equipment E is as shown in Table 5. Therefore, the packet transmission destination identification code is set to "ID-E." The packet number is set to the serial number of the packet transmitted by communication equipment B itself.

TABLE 5

Information of Other Equipments in Equipment B

| Equipment Name | Equipment Identification Code | Packet Transmission Destination Identification Code |
| --- | --- | --- |
| A | ID-A | ID-A |
| C | ID-C | ID-C |
| D | ID-D | ID-D |
| E | ID-E | ID-E |

The data of packet P9 is the same as the data of the received packet P8. The relay transferring data always adds the packet number of the received packet to the auxiliary data of the received packet, and stores in the auxiliary data of the packet to be transferred. More specifically, communication equipment B stores, in the auxiliary data of packet P9, the first transmission packet stored in the auxiliary data of the received packet B8, as well as the packet number of packet P8.

When communication equipment B transmits the packet P9, communication equipments A and C–E receive the packet P9. Communication equipments A, C and D ignore the packet P9, since neither the packet transmission destination identification code nor the data transmission destination identification code of the packet P9 match the identification codes of them.

The information of other equipments in communication equipment E is as shown in Table 6 below.

TABLE 6

Information of Other Equipments in Equipment E

| Equipment Name | Equipment Identification Code | Packet Transmission Destination Identification Code |
| --- | --- | --- |
| A | ID-A | ID-A |
| B | ID-B | ID-B |
| C | ID-C | ID-C |
| D | ID-D | ID-D |

Communication equipment E recognizes, as the packet transmission destination identification code of packet P9 is "ID-E" which matches the identification code of it, that the packet P9 is transmitted to it, and stores packet P9. Further, communication equipment E recognizes, as the data transmission destination identification code of packet P9 matches the identification code of it, that the data of packet P9 is transmitted to it, and performs the following process.

First, communication equipment E reads data transmission source identification code and the packet transmission source identification code of packet P9 and compares these with each other. Since these do not match each other, communication equipment E determines that the packet P9 has been transmitted through a relay. Further, communication equipment E reads the packet type code of packet P9. Since the packet type code is "general data," communication equipment E then reads auxiliary data from packet P9. As already described, the auxiliary data of packet P9 stores the first transmission packet number and the packet number of packet P8 transmitted this time from communication equipment A to communication equipment B. Communication equipment E reads these packet numbers from auxiliary data of packet P8.

Since a reception response packet must be transmitted in response to the general data, communication equipment E prepares and transmits the reception response packet (FIG. 4, S10). The reception response packet corresponds to packet P10 of FIG. 5. The data of packet P10 includes the packet number added by communication equipment E to the auxiliary data, that is, the packet number of packet P8 transmitted by communication equipment A. The packet transmission destination identification code of reception response packet is "ID-A," from Table 6.

Further, communication equipment E compares the first transmission packet number read from the auxiliary data of packet P9 with the packet number of the packet stored, which has been received from communication equipment A. If the packet number which is received as the first transmission packet number has already been stored, communication equipment E discards the newly received packet P9. If the packet number which is the same as the first transmission packet number is not yet stored, communication equipment E stores the newly received packet P9.

The reason for carrying out the above described process is as follows. In the foregoing, it is assumed that the packet P3 which was transmitted from communication equipment A directly to communication equipment E failed to reach communication equipment E. Communication equipment E does not receive packet P3, and hence the reception response packet in response to packet P3 is not transmitted and communication equipment A does not receive the reception response packet with respect to packet P3.

However, even when the packet directly transmitted from communication equipment A to communication equipment E reaches and is received by communication equipment E and communication equipment E transmits the reception response packet to this packet, it may be possible that communication equipment A fails to receive the reception response. For example, the reception response may not reach from communication equipment E to communication equipment A when the wireless output of communication equipment E is small or when there appears an obstacle between communication equipments E and A. In such a case, as the packet transmitted from communication equipment A has been received by communication equipment E, actually, it is not necessary to retransmit the packet.

However, in the present system, transmission of a packet is not considered completed when a general data packet is transmitted, until the corresponding reception response packet is received, as described above. Therefore, even in the above described situation, communication equipment A determines that the data was not received by communication equipment E, and retransmits the data in order to prevent missing of part of a series of data. Meanwhile, communication equipment E has already received the data. Therefore, when the same data is retransmitted, communication equipment E would have the data doubled, which may result in disorder of the data received thereafter, and proper data processing by communication equipment E may be impossible.

In such a situation, if the first transmission packet number is compared with the already stored packet number and when there is a matching one, the packet is discarded, so that double reception of data can be prevented, and erroneous processing of data can be prevented.

This process to avoid redundant data holding which may result from retransmission may be performed not only in the relayed transmission but also in the direct transmission. For example, in retransmission from S3 to S5 described above, when communication equipment E receives data and the reception response packet from communication equipment E is not received by communication equipment A, double reception of data is likely. Thus the first transmission packet number is stored in the auxiliary data of packets P4 and P5 transmitted in S4 and S5 in order to enable the above described problem of double data reception.

Receiving the reception response packet P10, communication equipment A recognizes that the data from itself has been received by the destined communication equipment E, in the following manner. First, communication equipment A determines which packet transmitted from it is received by communication equipment E, in accordance with the packet number stored in the data of reception response packet P10. In this example, the packet number of packet P8 is stored in the data of packet P10. Therefore, communication equipment A recognizes that the packet P8 is received by communication equipment E. Further, based on the auxiliary data stored in the auxiliary data of packet P8, the packet number of the packet when the data of packet P8 was transmitted first can be recognized. Thereafter, communication equipment A stops retransmission of the packet.

Communication equipment A utilizes relayed transmission through communication equipment B when it transmits data to communication equipment E thereafter (FIG. 4, S11 and S12). What is utilized in this transmission is such a packet as packet P11 (from communication equipment A to communication equipment B) and P12 (from communication equipment B to communication equipment E) of FIG. 5. Since packet P11 is not transmitted for retransmission of the data, the auxiliary data of packet P11 is blank. The auxiliary data of packet P12 from communication equipment B to communication equipment E stores only the packet number of packet P11.

The reception response packet transmitted by communication equipment E in response to packet P12 (FIG. 4, S13) is of the type shown by packet P13 in FIG. 5.

When communication equipment A tries to transmit a packet to communication equipment E through communication equipment B as a relay, it may be possible that communication equipment A fails to receive the reception response packet from communication equipment E from some cause. More specifically, it is possible that communication equipment A fails to receive reception response packet P10 from communication equipment E, when communication equipment A transmits the packet P8 to communication equipment B in S8 of FIG. 4. In such a case, communication equipment A performs the following process.

As already described, when communication equipment A transmits an inquiry packet with respect to communication equipment E, it receives answer packets not only from communication equipment B but from other communication equipments C and D and it stores the information. if relayed transmission through communication equipment B is unsuccessful, communication equipment A attempts relayed transmission of data to communication equipment E, using either communication equipment C or D as a relay. At this time, the process in the present communication system is similar to that when relayed transmission is performed through communication equipment B. As to the manner how to select communication equipment C and D as the relay, there may be various standards. One possible method is to select the communication equipment as a relay in accordance with the order of transmission of the answer packets with respect to the inquiry packet, as already mentioned.

As described above, when direct transmission from one communication equipment to another communication equipment becomes impossible, the method of transmission is switched to relayed transmission using a further communication equipment as a relay.

Now, after relay transmission from one communication equipment to another communication equipment is started, direct transmission between these equipments may become possible thereafter. In such a case, it is necessary to switch the method of transmission again from the relayed transmission to the direct transmission, in order to light the burden on the relay and to improve overall system efficiency. The communication system in accordance with the present invention also provides the method of switching from the relayed transmission to the direct transmission, of which details are as follows.

Assume that the communication equipment in the wireless network moves and the state of the switching changes from (b) to (a) of FIG. 3. The information of other equipments held in communication equipment A is as shown in Table 4. Therefore, when communication equipment A transmits to communication equipment E, it prepares and transmits a packet P14 (FIG. 6) destined to communication equipment B (FIG. 4, S14). However, in the state of FIG. 3($a$), the wireless output of communication equipment A directly reaches communication equipment E. Therefore, packet P14 directly reaches and it is received by communication equipment E, as shown by the dotted line in S14 of FIG. 4.

Communication equipment E recognizes, as the data transmission destination identification code of packet P14 matches the identification code of itself, that the packet carries the data destined to it. Further, communication equipment E recognizes, as the packet transmission destination identification code of packet P14 is "ID-B" and not "ID-E" which is the identification code of it, that the data is transmitted by relayed transmission. Further, since the data transmission source identification code and the packet transmission source identification code of packet P14 are both "ID-A," communication equipment E recognizes that the packet transmitted from the data transmission source equipment for relayed transmission has been directly received by the communication equipment E. In other words, communication equipment E recognizes that direct data transmission from communication equipment A to communication equipment E becomes possible, and that, nevertheless communication equipment A continuously transmits data to communication equipment B by relayed transmission, using communication equipment B as a relay.

In such an event, relayed transmission is switched to direct transmission in the following manner. First, communication equipment E which has directly received the packet transmitted from communication equipment A destined to communication equipment B serving as a relay, does not store the packet, since the data to be transmitted by the packet should be transmitted from communication equipment B (FIG. 4, S15). Instead, communication equipment E stores how many packets destined to the relay have been received directly. Communication equipment E transmits a reception response packet P14 (FIG. 6) with respect to the packet (packet P15 of FIG. 2) transmitted from communication equipment B (FIG. 4, S16).

In this manner, relayed transmission is continued (FIG. 4, S17, S18, S19), and if the number of packets directly received reaches a prescribed number within a prescribed time period, communication equipment E determines that state of direct communication from communication equipment A to communication equipment E has become possible. Then communication equipment E transmits a relay cancelling packet P20 (FIG. 6) to communication equipment A (FIG. 4, S20). The relay cancelling packet is to notify that stable direct transmission from one communication equipment to another communication equipment becomes possible from said another communication equipment to said one communication equipment, and to request said one communication equipment to switch transmission from said one communication equipment to said another communication equipment from relayed transmission to direct transmission.

Referring to FIG. 6, the relay cancelling packet P20 includes a packet type code indicating "relay cancelling," the data transmission source identification code, the packet transmission source identification code, the data transmission destination identification code, and the packet transmission destination identification code. In the present example, in the packet P20 transmitted from communication equipment E to communication equipment A, the data transmission source identification code and the packet transmission source identification code are both "ID-E," representing communication equipment E. The data transmission destination identification code is "ID-A." Since the information of other equipments held in communication equipment E is as shown in Table 6, the packet transmission destination identification code of packet P20 is "ID-A" which corresponds to communication equipment A. Data and auxiliary data are blank.

Receiving the relay cancelling packet P20, communication equipment A recognizes that the packet P20 is the relay cancelling packet, in accordance with the packet type code. Further, since the data transmission source identification code is "ID-E" indicating communication equipment E, it recognizes that the relay cancelling packet requests switching of data transmission to communication equipment E from relayed transmission to direct transmission.

In response to the relay cancelling packet P20, communication equipment A changes the packet transmission destination identification code for the communication equipment E in the information table of other equipments held therein, from "ID-B" to "ID-E." As a result, the table of information of other equipments held by communication equipment A is changed as shown in Table 1. When data is to be transmitted from communication equipment A to communication equipment E thereafter, communication equipment A transmits the packet directly to communication equipment E (FIG. 4, S21). In other words, transmission from communication equipment A to communication equipment E is switched from relayed transmission to direct transmission.

Efficiency in communication in relayed transmission is inferior to that of direct transmission. Therefore, generally, direct transmission is preferred to relay transmission, if direct transmission is possible. However, if switching from the relayed transmission to the direct transmission is performed while direct transmission is not stably possible, the efficiency in communication may be lower. For example, consider a situation in which direct transmission between communication equipments is impossible since there is an obstacle between the communication equipments. Then it is possible that the obstacle moves temporarily, allowing direct transmission between the communication equipments. However, if the obstacle or other obstacles immediately appear between the communication equipments, direct transmission soon becomes impossible, and then direct transmission cannot be continued. Then, it becomes necessary to transmit an inquiry packet and answer packets in order to find an equipment which can serve as a relay. Specifically, even when the number of packets transmitted is temporarily reduced from the number of packets transmitted in relayed transmission as direct transmission is performed, in the above described situation, larger number of packets than the reduced number must be transmitted in order to resume relayed transmission.

In the communication system of the present embodiment, the method of transmission is not immediately switched from the relayed transmission to the direct transmission even when it is detected that direct transmission is possible. Whether the direct transmission is possible or not is monitored for a prescribed time period, and the relay cancelling packet is not transmitted until it is confirmed that direct transmission is stable. Accordingly, frequent switching between direct transmission and relayed transmission can be prevented, and hence decrease in the efficiency in communication within the network can be prevented.

In the foregoing, it has been assumed that special data related to the function of the communication system, such as reception response, answer and relay cancelling are transmitted by direct transmission. However, these special data may be transmitted by relayed transmission in the similar manner as general data. The special data are transmitted through a relay in the following manner.

Assume that the tables of information of other equipments held by communication equipments A, B, C and E are as shown in Tables 7, 8, 9 and 10, respectively.

TABLE 7

Information of Other Equipments in Equipment A

| Equipment Name | Equipment Identification Code | Packet Transmission Destination Identification Code |
|---|---|---|
| B | ID-B | ID-B |
| C | ID-C | ID-C |
| D | ID-D | ID-D |
| E | ID-E | |

TABLE 8

Information of Other Equipments in Equipment B

| Equipment Name | Equipment Identification Code | Packet Transmission Destination Identification Code |
|---|---|---|
| A | ID-A | ID-A |
| C | ID-C | ID-C |
| D | ID-D | ID-D |
| E | ID-E | ID-E |

TABLE 9

Information of Other Equipments in Equipment C

| Equipment Name | Equipment Identification Code | Packet Transmission Destination Identification Code |
|---|---|---|
| A | ID-A | ID-B |
| B | ID-B | ID-B |
| D | ID-D | ID-D |
| E | ID-E | ID-E |

TABLE 10

Information of Other Equipments in Equipment E

| Equipment Name | Equipment Identification Code | Packet Transmission Destination Identification Code |
|---|---|---|
| A | ID-A | ID-B |
| B | ID-B | ID-B |
| C | ID-C | ID-C |
| D | ID-D | ID-D |

Assume that data is transmitted from communication equipment A to communication equipment C, and that communication equipment C transmits a reception response packet. Packets P31 and P33 transmitted at this time are as shown in FIG. 7.

Packet P31 of FIG. 7 is directly transmitted from communication equipment A to communication equipment C. This is because, according to information of other equipments held by communication equipment A (Table 7), the packet transmission destination identification held for communication equipment C is "ID-C" which matches the identification code of communication equipment C. Referring to FIG. 7, the packet type of packet P31 is general data, and the packet transmission source identification code, the packet transmission destination identification code, the data transmission source identification code and the data transmission destination identification code are ID-A, ID-C and ID-A and ID-C, respectively. It is assumed that the packet number is "150" and the data is "data 7." The auxiliary data is blank.

Referring to Table 9, from the table of information of other equipments held by communication equipment C, the packet transmission destination identification code for communication equipment A is "ID-B." More specifically, when communication equipment C transmits data to communication equipment A, the direct transmission destination of the packet is set to communication equipment B. At this time, the reception response packet P32 to communication equipment A, which is transmitted from communication equipment C to communication equipment B in response to packet P37, is as shown in FIG. 7.

Receiving packet P32, communication equipment B changes, referring to the table of information of other equipments shown in Table 8, the packet transmission destination identification code of packet P32 to "ID-A," prepares packet P33 (FIG. 7) and transmits it. Referring to FIG. 7, the packet transmission source identification code of packet P33 is "ID-B." The packet type code is still "reception response." The packet number of the received packet P32 is written to the auxiliary data of packet P33. Receiving the reception response packet P33, the communication equipment A recognizes that data of packet P31 transmitted from itself is received by communication equipment E. In this manner, the reception response packet can be transmitted through a relay. It goes without saying that the reception response packet may be transmitted through a relay not only to the data directly transmitted but also to the data transmitted through a relay.

Figure 8:
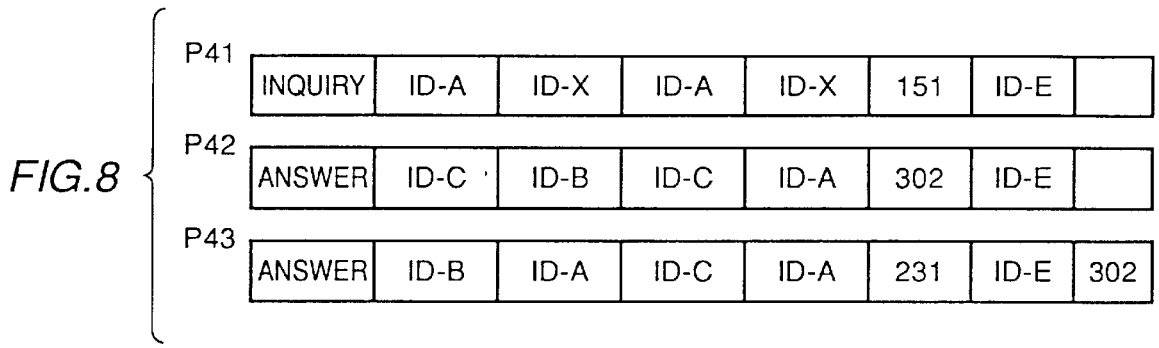
FIG. 8 shows an inquiry packet and an answer packet used in a system in accordance with one embodiment of the present invention.

Relay transmission of an answer packet will be described. Assume that the information tables of other equipments held by communication equipments A, B, C and E are as shown in Tables 7 to 10. Consider an example where communication equipment A transmits an inquiry packet and communication equipment C transmits an answer packet. The packet transmitted at this time is shown in FIG. 8. Of the information of other equipments held by communication equipment A, the packet transmission destination identification code for communication equipment E is blank in Table 7. More specifically, there is not a packet transmission destination for communication equipment A, when data is to be transmitted to communication equipment E. At this time, communication equipment A transmits an inquiry packet P41 shown in FIG. 8.

Receiving inquiry packet P41, communication equipment C determines whether direct transmission from communication equipment C to communication equipment E is possible, by referring to the table (Table 9) of the information of other equipments held in communication equipment C. According to Table 9, the packet transmission destination identification code of communication equipment C for communication equipment E is "ID-E." Since the packet transmission destination identification code for the communication equipment E matches the identification code of communication equipment E, the communication equipment C determines that direct transmission to communication equipment E is possible. Therefore, communication equipment C transmits an answer packet destined to communication equipment A.

Now, the transmission destination of the answer packet is also determined from the table of information of other equipments for the communication equipment C shown in Table 9. According to Table 9, the direct packet transmission destination identification code when data is to be transmitted from communication equipment C to communication equipment A is "ID-B." Namely, when data is to be transmitted from communication equipment C to communication equipment A, the first packet transmission destination is communication equipment B. Communication equipment C transmits a packet P42 shown in FIG. 8 as the answer packet.

Receiving answer packet P42, communication equipment B changes the packet transmission destination identification code and the packet transmission source identification code to "ID-A" and "ID-B", respectively, and transmits a packet P43. The packet type code of packet P43 is "answer." The packet number of packet P42 is written to the auxiliary data of packet B43. In this manner, the answer packet is transmitted through a relay from communication equipment C to communication equipment A.

The relay cancelling packet can be transmitted through a relay in the same manner as described above. It is possible to transmit the inquiry packet through a relay. However, the purpose for transmitting an inquiry packet is to find such a communication equipment that is capable of direct transmission from the data transmission source and capable of direct transmission to the data transmission destination. Therefore, transmission of an inquiry packet through a relay is meaningless.

There may be cases where data cannot be transmitted from each communication equipment to a data transmission destination communication equipment either by direct transmission or relayed transmission. In that case, each communication equipment repeats trial of direct transmission of data to that transmission destination equipment and transmission of inquiry packet, until either a reception response packet or an answer packet is received. If a reception response packet to direct data transmission is received, each communication equipment sets the packet transmission destination identification code for the data transmission destination equipment at the identification code of the data transmission destination equipment, of the information of other equipments it holds. Thereafter, direct transmission is performed from the said communication equipment to the data transmission destination equipment. When an answer packet to the inquiry packet is received, the packet transmission destination identification code for the data transmission destination equipment is set to the identification code of the communication equipment which has transmitted the answer packet. Thereafter, relayed transmission is performed from the said communication equipment to the data transmission destination equipment.

In the present embodiment, the inquiry packet is broadcast to a plurality of communication equipments. However, the present invention is not limited to such an implementation. For example, the inquiry packet may be transmitted individually to each of the communication equipments. In that case, the number of inquiry packets is increased, while the number of answer packets is reduced.

Further, in the present embodiment, the auxiliary data is used for specifying a corresponding packet at the time of retransmission and relayed transmission of data. However, the auxiliary data may be used for other purposes. For example, reception level of the received packet, that is, the intensity of the received signal may be written in the auxiliary data of the reception response packet. Then, the data transmission source equipment can recognize with what sensitivity the signal transmitted from itself is received by the data transmission destination equipment.

In the above described embodiment, there is only one relay between the data transmission source equipment and the data transmission destination equipment. However, the present invention is not limited to such a system, and the packet configuration of the present invention may be used for relayed transmission including a plurality of intervening relays.

Figure 9:
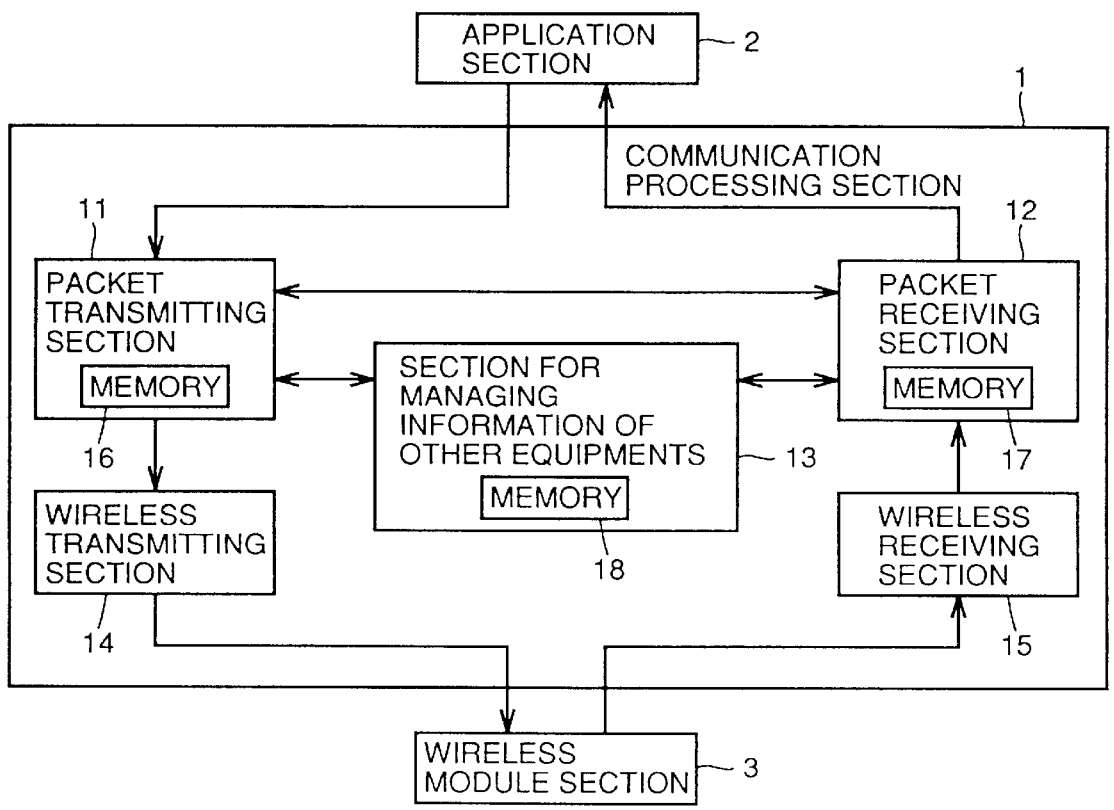
FIG. 9 is a block diagram showing a structure of a wireless communication equipment used in the present invention.

The operation of the overall system has been described, and a wireless communication equipment constituting the system will be described in the following. Referring to FIG. 9, the communication equipment in accordance with the present invention includes a communication processing section 1 for performing communication with other communication equipments, utilizing switching between direct transmission and relayed transmission described above, an application section 2 connected to communication processing section 1 for preparing data to be transmitted, for processing received data and for providing wireless network service to the user of the communication equipment; and a wireless module 3 connected to communication processing section 1 for transmitting and receiving wireless signals, including modulation/demodulation processing.

Communication processing section 1 includes a packet transmitting section 11 for preparing a packet to be transmitted; a wireless transmitting section 14 for converting the packet received from packet transmitting section 11 to a signal sequence and for applying the sequence to wireless module unit 3; a wireless receiving system 15 for converting a signal sequence received and demodulated by wireless module unit 3; a packet receiving section 12 for analyzing a header of the packet received from the wireless receiving section and for performing processes in accordance with the contents of the header; and a section 13 for managing information of other equipments within the network.

The section 13 for managing information of other equipments includes a memory 189 storing identification codes corresponding to equipment names of other communication equipments, and respective identification codes of the direct packet transmission destinations when data is to be transmitted to the equipments. The information is in the form of a table, as shown in Tables 1 to 10. The section 13 for managing information of other equipments provides, in response to an inquiry from packet transmitting section 11 or from packet receiving section 12, a communication equipment name, identification code or packet transmission destination identification corresponding to the given information. The section 13 for managing information of other equipments receives an update command from packet receiving section 12, and updates the packet transmission destination identification code corresponding to the communication equipment of which updating is required.

The packet transmitting section 11 stores an identification code of its own, a table of packet type, and the number of packets it has transmitted. Packet transmitting section 11 receives the packet transmission destination identification code and the data transmission destination identification code from the section 13 for managing information of other equipments, and prepares a header of a packet based on the information stored therein. Packet transmitting section 11 prepares a packet by adding the header to the data to be transmitted, and applies the packet to wireless transmitting section 14. Packet transmitting section 11 has a memory 16 and stores, when data is transmitted, the data until a reception response packet to the data is received.

Similar to the packet transmitting section 11, the packet receiving section 12 stores the identification code of its own and a table of packet type codes. Packet receiving section 12 compares the packet transmission destination identification code and the data transmission destination identification code stored in the received packet with the identification code of its own so as to determine whether the packet or the data is destined to it. Packet receiving section 12 includes a memory 17 and stores in memory 17 the packet transmitted to it.

Figure 10:
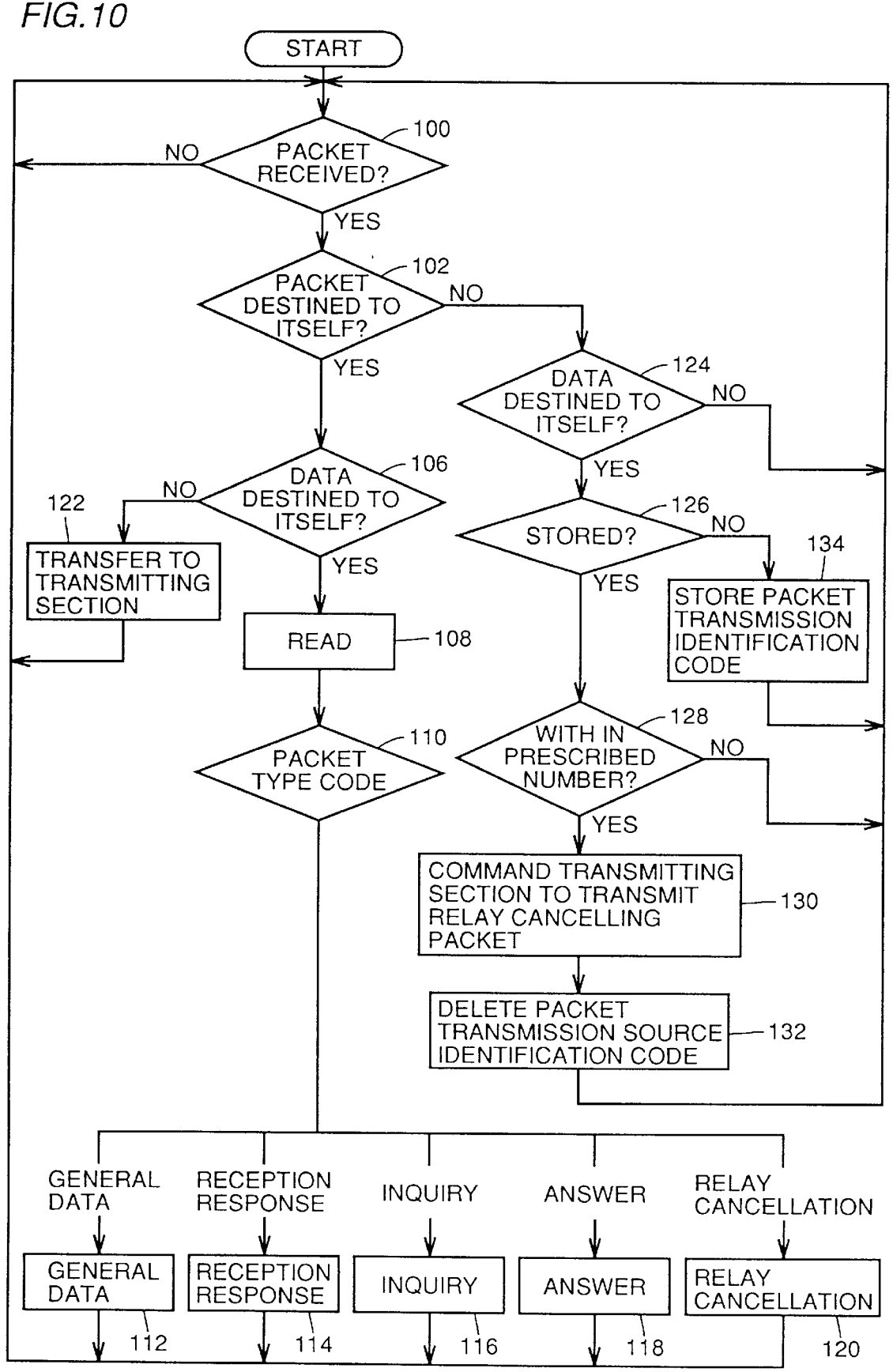
FIG. 10 is a flow chart showing the operation of a packet receiving section of the wireless communication equipment shown in FIG. 9.

Referring to FIGS. 9 and 10, the operation of the communication processing section 1 when a packet is received will be described mainly referring to the operation of packet receiving section 12. Packet receiving section 12 receives a demodulated signal sequence as a packet from wireless module 3 (100). When the received packet is not destined to it and the data carried by the packet is not destined to it, the packet receiving section 12 ignores the packet (102, 124). When the received packet is destined to it (102), packet receiving section 12 determines whether or not the data in the received packet is destined to it (106). If the data of the received packet is destined to it, packet receiving section 12 reads, from the header of the received packet, the packet identification code, the packet transmission source identification code, data transmission destination identification code, packet number and auxiliary data (108). Packet receiving section 12 performs the following processes in accordance with the packet type code (110, 112, 114, 116, 118, 120).

Figure 11:
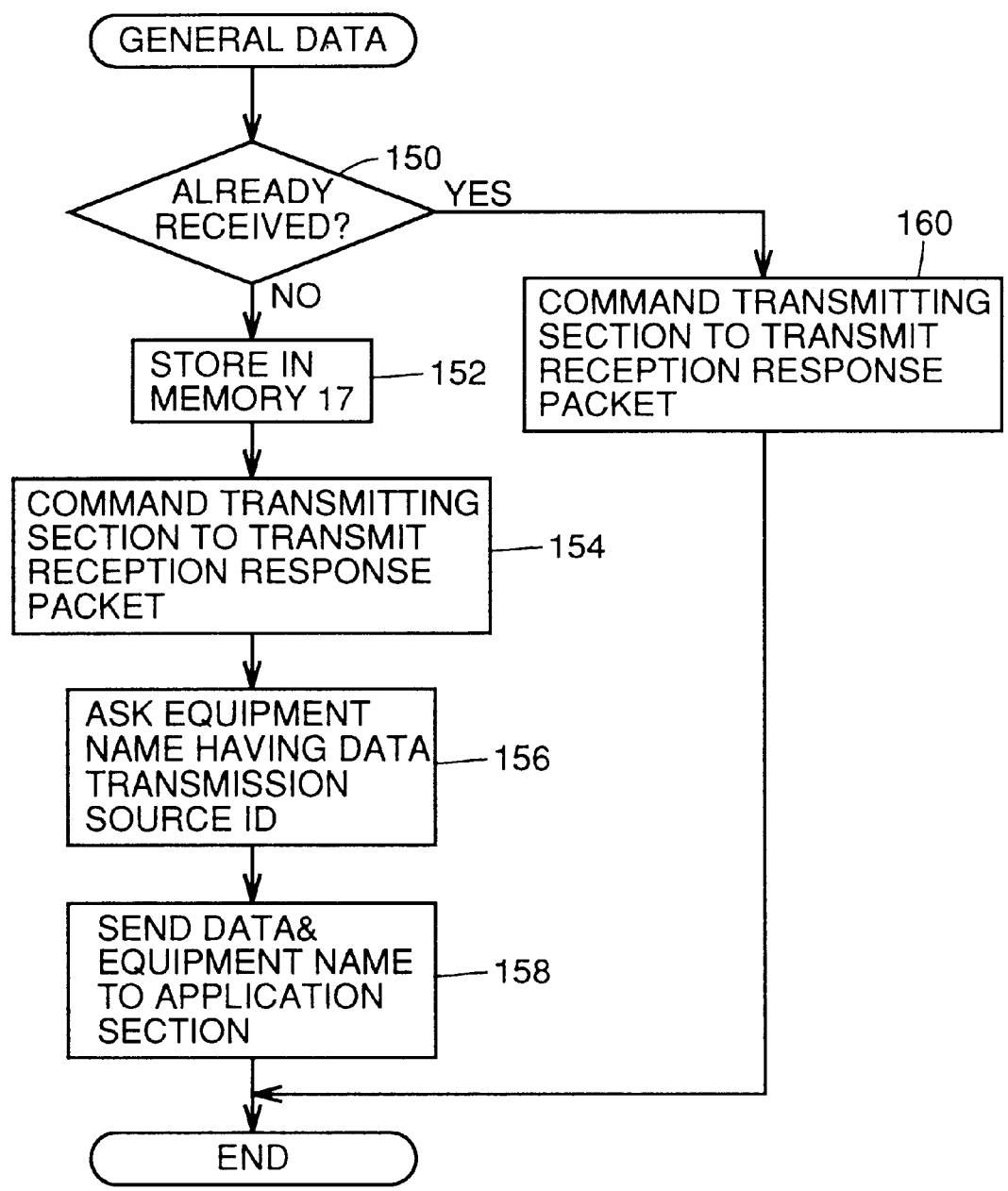
FIG. 11 is a flow chart showing a general data reception process.

If the packet type code indicates "general data" (112), packet receiving section 12 performs the process shown in FIG. 11. Referring to FIG. 11, first, packet receiving section 12 determines, based on the data transmission source identification code and first transmission number in auxiliary data of the received packet, whether the same packet has been already received and stored in memory 17 (150). If the same packet is not yet received, packet receiving section 12 stores the received packet in memory 17 (152), applies a data transmission source identification number and the packet number to packet transmitting section 11, and commands transmission of a reception response packet to the said packet (154). The packet number transmitted at this time is the one written in the header of the received packet when the packet transmission source identification code matches the data transmission source identification code, that is, when the packet is transmitted by direct transmission, and it is the one stored in the auxiliary data of the packet when these do not match, that is, when the packet is transmitted through a relay.

Thereafter, packet receiving section 12 asks the equipment name corresponding to the data transmission source identification code to the section 13 for managing information of other equipments (156), sends the obtained equipment name together with the data to application section 2 (158), and completes the processing for general data.

When it is determined that the same packet has been already received and stored in memory 17 (150), packet receiving section 12 simply commands transmission of the reception response packet to packet transmitting section 11 (160), and completes processing for the general data.

Figure 12:
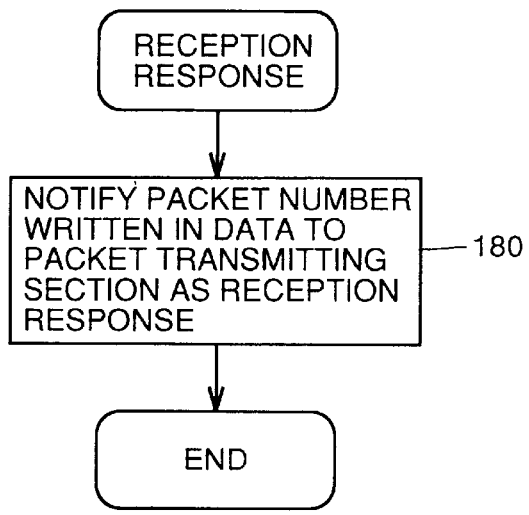
FIG. 12 is a flow chart of a reception response process.

Referring to FIG. 10, when the packet type code indicates "reception response" (114), packet receiving section 12 performs the process shown in FIG. 12. Referring to FIG. 12, packet receiving section 12 notifies the packet number stored in the data of the received packet to packet transmitting section 11 as reception response (180) and completes the process.

Figure 13:
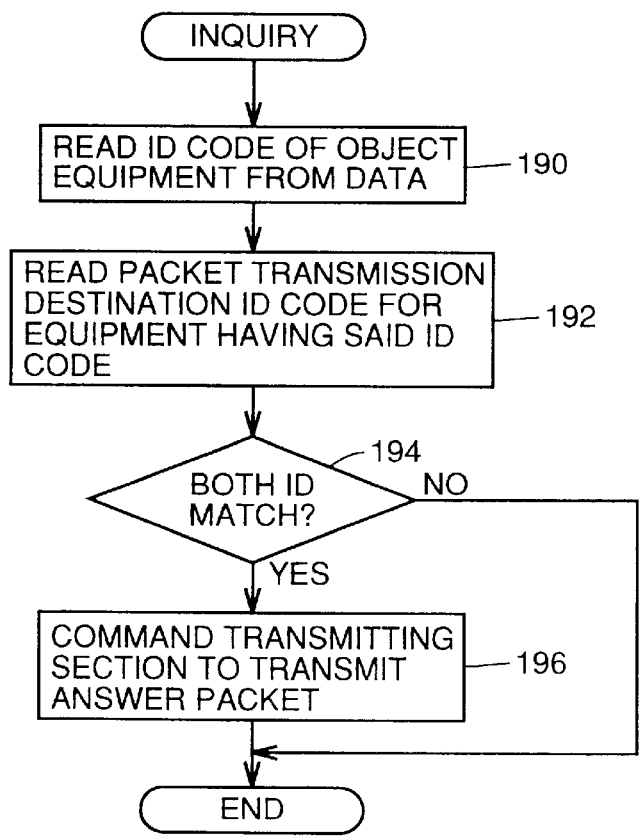
FIG. 13 is a flow chart showing a process when an inquiry packet is received.

Referring to FIG. 10, when the packet type code indicates "inquiry" (116), the packet receiving section 12 performs the process shown in FIG. 13. Referring to FIG. 13, first, packet receiving section 12 reads the identification code of the object communication equipment from the data of the received packet (190), and reads the packet transmission destination identification code for the communication equipment having the identification code from the section 13 for managing information of other equipments (192). Packet receiving section 12 compares the identification code read from the packet with the packet transmission destination identification code obtained from the section 13 for managing information of other equipments (194). If these match each other, packet receiving section 12 provides the identification code and the data destination source identification code of the received packet to packet transmitting section 11, and commands transmission of an answer packet to packet transmitting portion 11 (196). When the identification code read from the packet does not match the packet transmission destination identification code obtained from the section 13 for managing information of other equipments (194), packet receiving section 12 completes the process for the inquiry packet.

Figure 14:
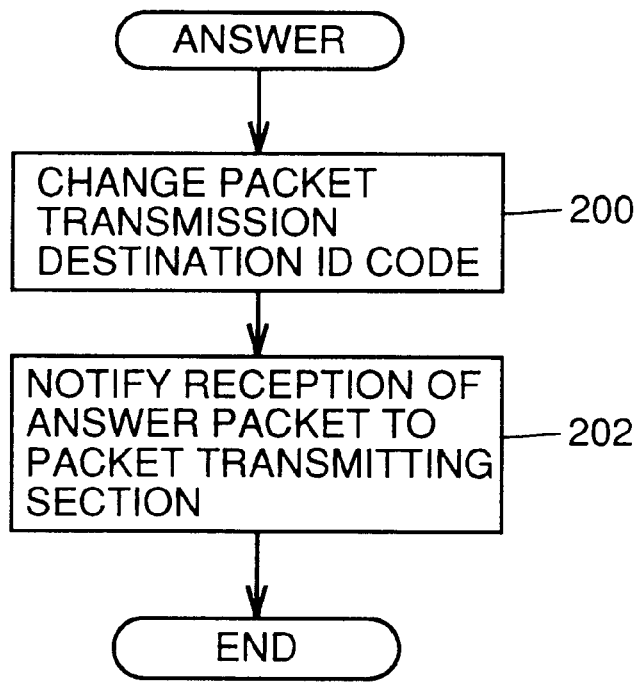
FIG. 14 is a flow chart showing a process when an answer packet is received.

Referring to FIG. 10, when the packet type code indicates "answer" (118), the packet receiving section 12 performs the process shown in FIG. 14. Referring to FIG. 14, first, packet receiving section 17 provides the identification code in the data of the received packet and the data transmission source identification code of the received packet to the section 13 for managing information of other equipments, so that the packet transmission destination identification code for the communication equipment having the identification code in the data of the received packet is changed to the data transmission source identification code of the received packet (200). Further, packet receiving section 12 applies the identification code in the data of the received packet to packet transmitting section 11, notifies transmission of the answer packet to packet transmitting section 11 (202), and the processing of the answer packet is completed.

Figure 15:
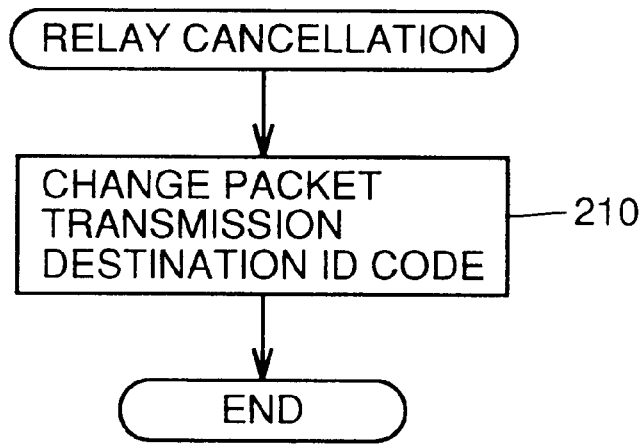
FIG. 15 is a flow chart showing a process when a relay cancelling packet is received.

Referring to FIG. 10, if the packet type code indicates "relay cancellation" (120), packet receiving section 12 performs the process shown in FIG. 15. Referring to FIG. 15, packet receiving section 12 provides the data transmission source identification code of the received packet to the section 13 for managing information of other equipments, so that the packet transmission destination identification code for the communication equipment having the identification code is changed to that identification code (210).

Again referring to FIG. 10, when the packet is destined to it (102) and the data is not destined to it (106), packet receiving section 12 transmits the entire packet to packet transmitting section 11, and commands transfer of the packet (122).

If the packet is not destined to it (102) and the data is destined to it (124), packet receiving section 12 determines whether or not the packet transmission source identification code of the packet has been already stored (126). If the packet transmission source identification code of the packet has not yet been stored, packet receiving section 12 stores the packet transmission source identification code (134), and completes the processing of the packet.

If the packet transmission source identification code has been already stored, packet receiving section 12 determines whether the packet has been received prescribed times within a predetermined time period from the same packet transmission source equipment (121). If it is YES, packet receiving section 12 sends the packet transmission source identification code to packet transmitting section 11, and commands to transmit the relay cancelling packet (130) to the communication equipment having the identification code. Further, packet receiving section 12 deletes the packet transmission source identification code from the memory (132), and completes the processing of the packet.

The packet receiving section 12 processes the received packet in the above described manner.

Figure 16:
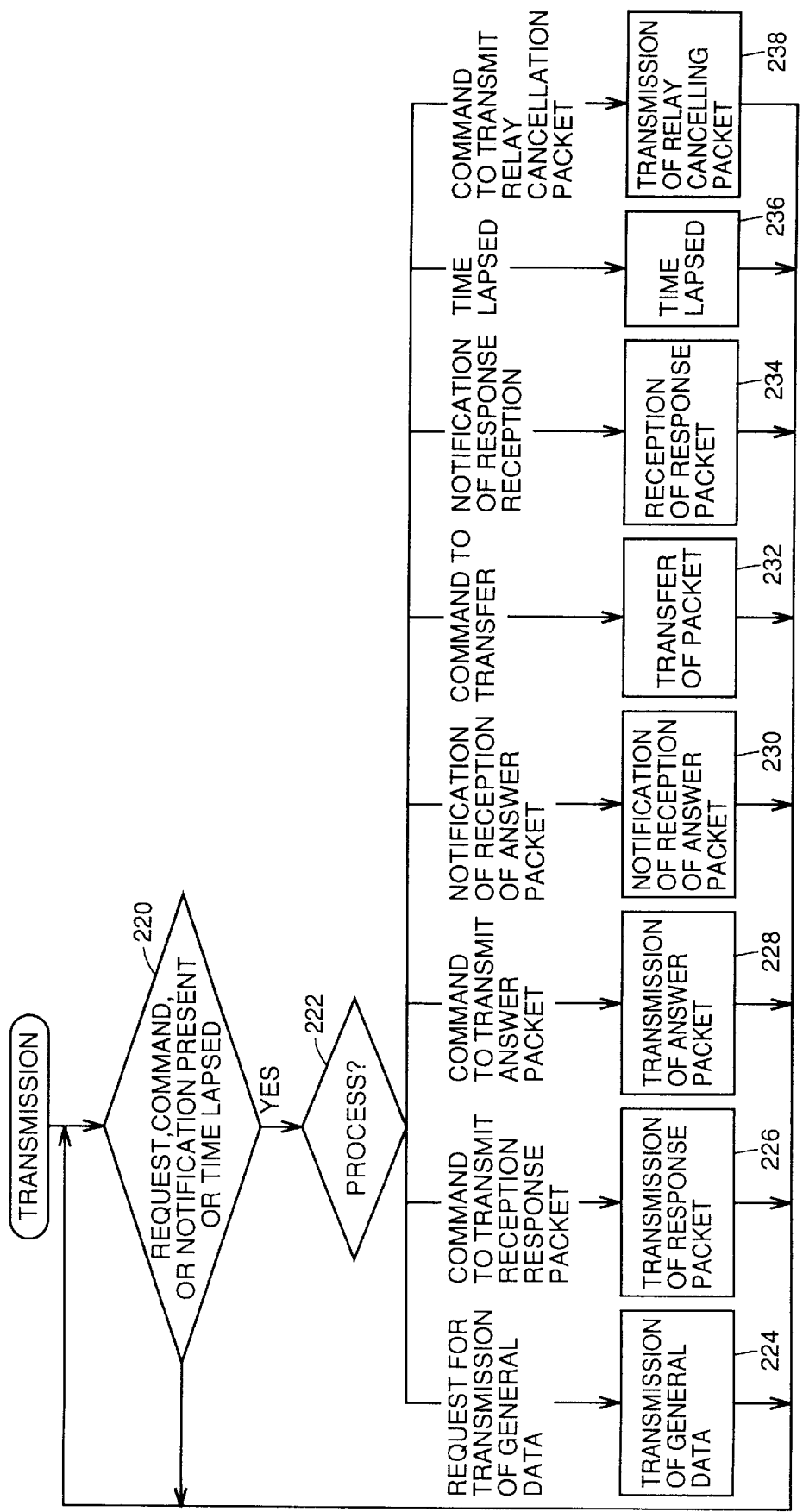
FIG. 16 is a flow chart showing a process at a packet transmitting section in the wireless communication equipment shown in FIG. 9.

The operation of the communication processing section 1 at the time of packet transmission will be described in the following with reference to FIGS. 9 and 16, mainly focusing on the operation of packet transmitting section 11. Referring to FIG. 16, packet transmitting section 11 determines whether or not there is a request, command or notification from application section 2, communication processing section 1 or packet receiving section 12, and determines whether or not there is a reception notification of a reception response packet after the lapse of a prescribed time period from transmission of general data (220), and carries out any of the following processes (222, 224, 226, 228, 230, 232, 234, 236, 238) in accordance with the result of determination.

Figure 17:
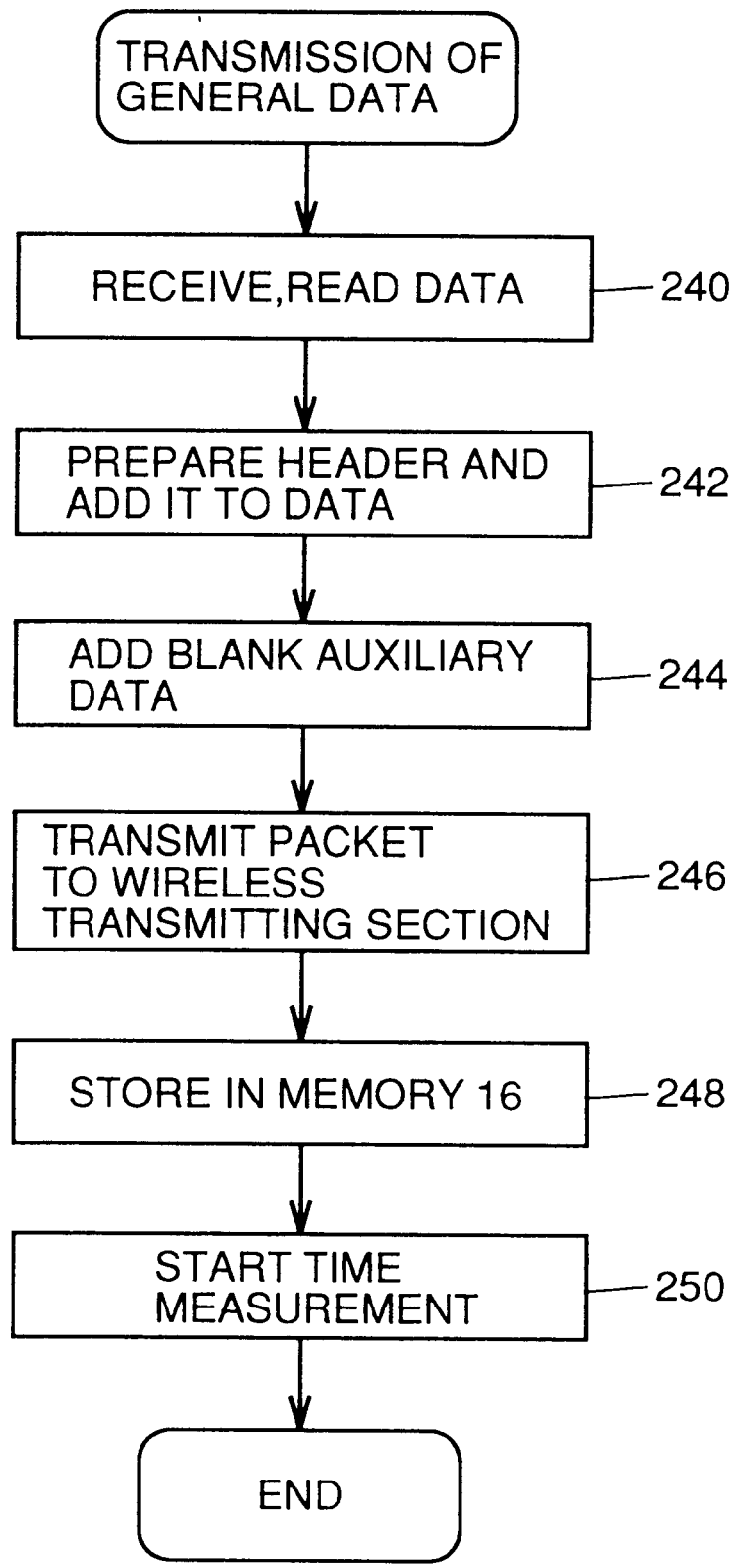
FIG. 17 is a flow chart showing general data transmission process.

When there is a transmission request of general data from application section 2 (224), packet transmitting section 11 performs the process shown in FIG. 17. Referring to FIG. 17, packet transmitting section 11 receives data and equipment name of the data transmission destination from application section 2. Further, packet transmitting section 11 receives data transmission destination identification code and packet transmission destination identification code corresponding to the equipment name of the data transmission destination, from the section 13 for managing information of other equipments (240). Thereafter, packet transmitting section 11 prepares a header storing a packet type code, the identification code of itself, the packet transmission destination identification code, identification code of itself, data transmission destination identification code and the packet number in this order, and adds the header to the data (242). Packet transmitting section 11 prepares a packet by adding a blank auxiliary data to the header and data (244), and applies the packet to wireless transmitting section 14 (246). Packet transmitting section 11 stores the packet in memory 16 (248).

When the packet transmitted by the wireless module 3 to wireless transmitting section 14 is received by the data transmission destination equipment, the data transmission destination equipment will transmit a reception response packet. Packet receiving section 12 will receive the reception response packet and transmits the packet number within the data to packet transmitting section 11, as already described. Therefore, packet transmitting section 11 starts time measuring (250), waits for notification of the packet number within a prescribed time period from packet receiving section 12 for making determination of step 220 described above, and completes processing of general data.

Figure 18:
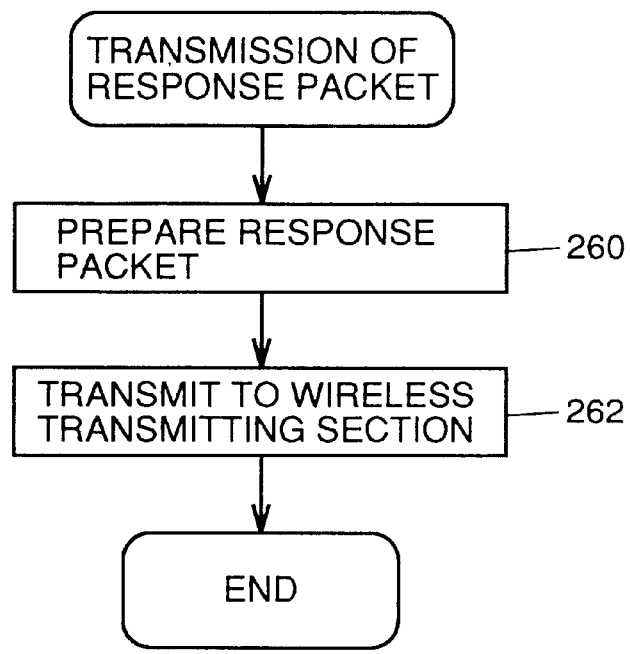
FIG. 18 is a flow chart of a process for transmitting a response packet.

Again referring to FIG. 16, when there is a transmission command of reception response packet from packet receiving section 12 (226), packet transmitting section 11 performs the process shown in FIG. 18. Referring to FIG. 18, packet transmitting section 11 receives the data transmission source identification number and the packet number from packet receiving section 12 and prepares a response packet (260), transmits the response packet to wireless transmitting section (262), and completes the response packet transmitting process.

Figure 19:
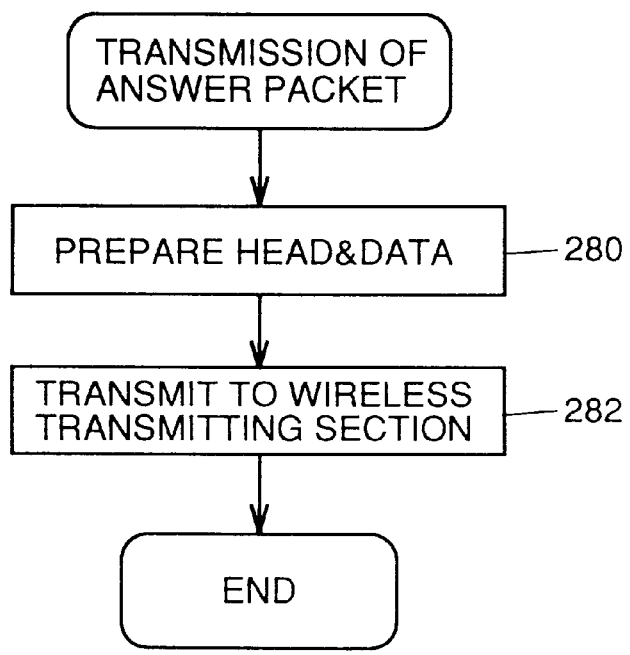
FIG. 19 is a flow chart of a process when an answer packet is to be transmitted.

Referring to FIG. 16, when there is a transmission command of an answer packet from packet receiving section 12 (228), the packet transmitting section 11 performs the process shown in FIG. 19. Referring to FIG. 19, packet transmitting section 11 prepares the data and the header of the packet based on the information applied from packet receiving section 12 in response to transmission command of an answer packet (280), transmits thus prepared packet to wireless transmitting section 14 (282), and completes the process for transmitting an answer packet.

Figure 20:
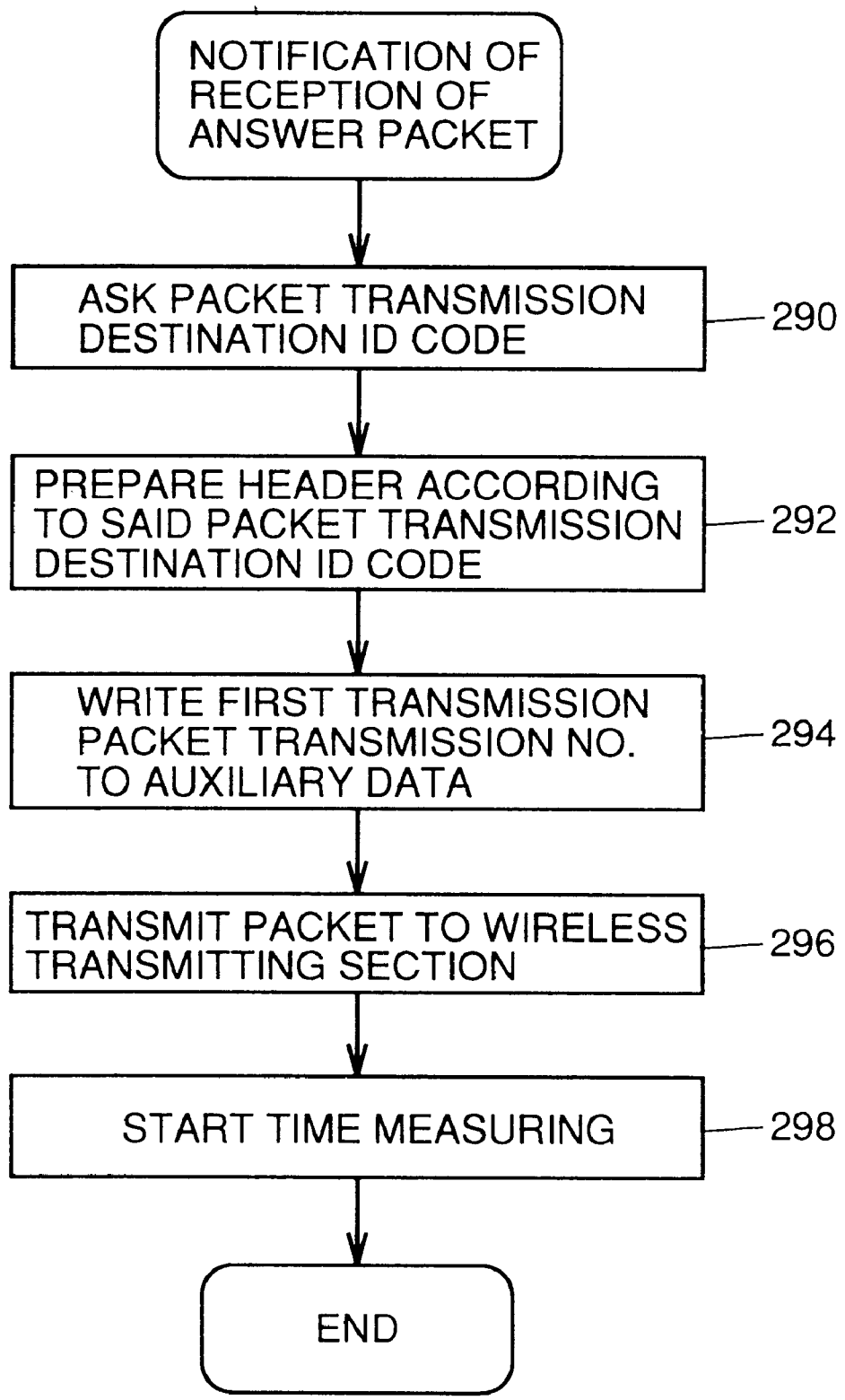
FIG. 20 is a flow chart showing a process when an answer packet reception notification is received.

Referring FIG. 16, when notified of reception of an answer packet from packet receiving section 12 (230), packet transmitting section 11 performs the process shown in FIG. 20. At this time, packet receiving section 12 has commanded the section 13 for managing information of other equipments to update the packet transmission destination identification code of the communication equipment associated with the inquiry packet to the data transmission source identification code of the answer packet in response to reception of the answer packet, and accordingly, the section 13 for managing information of other equipments has already updated the packet transmission destination identification code of the communication equipment in question.

Referring to FIG. 20, packet transmitting section 11 asks the section 13 for managing information of other equipments, for the updated packet transmission destination identification code with respect to the data transmission destination equipment associated with the inquiry packet (290). Packet transmitting section 11 prepares a header which includes a packet transmission destination identification code as the packet transmission destination identification code obtained from the section 13 for managing information of other equipments (292), adds thus prepared header to the data to be transmitted, and thus prepares a packet. Packet transmitting section 11 writes the first transmission packet number to the auxiliary data of the prepared packet (294). The packet prepared in this manner is transmitted to wireless transmitting section 14 (296). Further, packet transmitting section 11 starts time measuring (298) so as to determine whether or not the packet transmitted in this manner reaches the data transmission destination and a reception response packet is transmitted back from the data transmission destination within a prescribed time period, and the process is thus completed.

Figure 21:
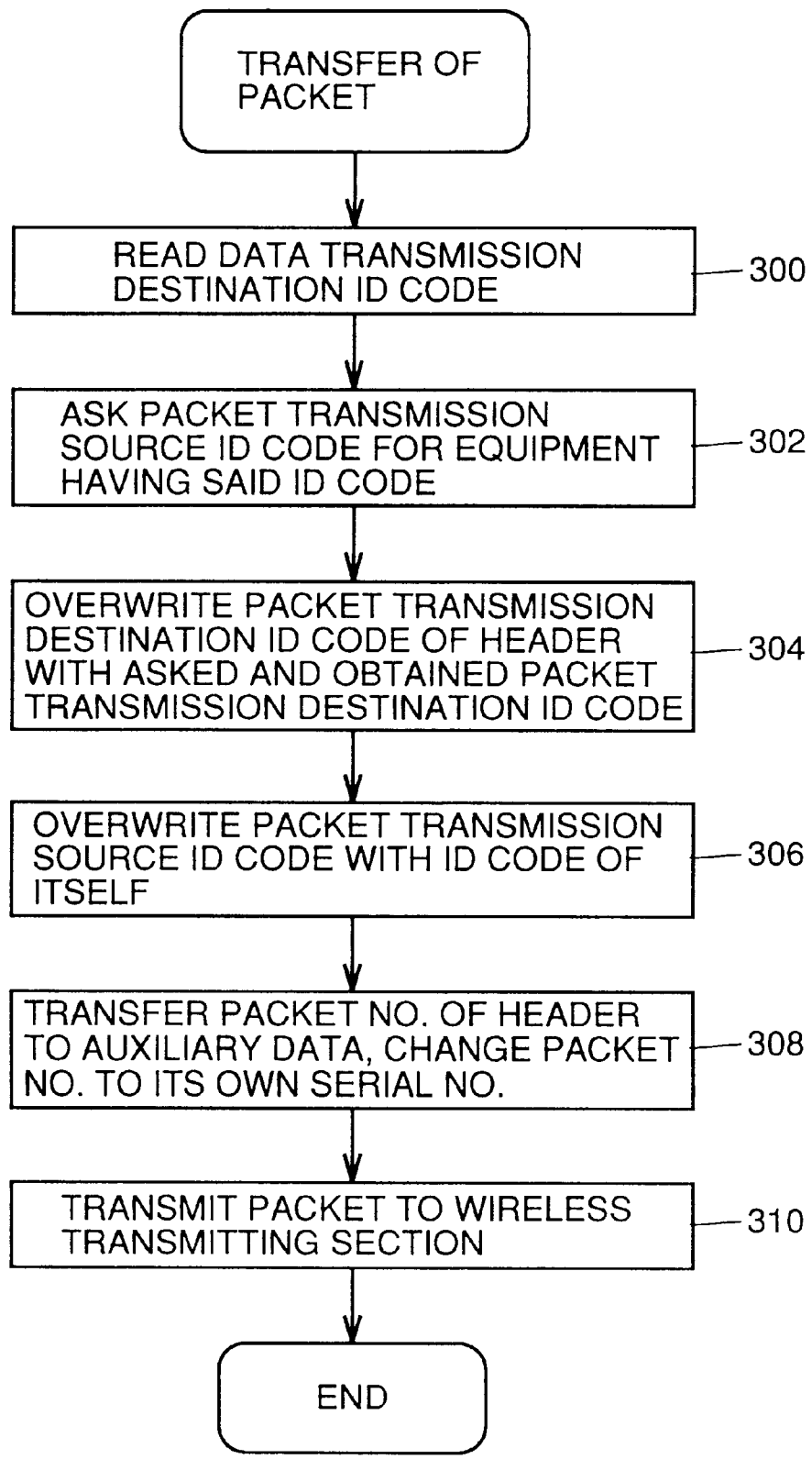
FIG. 21 is a flow chart when packet transfer command is received.

Again referring to FIG. 16, when there is a command for transferring the reception packet from packet receiving section 12 (232), packet transmitting section 11 performs the process shown in FIG. 21. Referring to FIG. 21, packet transmitting section 11 reads data transmission destination identification code from the packet applied from packet receiving section 12, in response to transfer command of the received packet (300). Thereafter, packet transmitting section 11 asks the section 13 for managing information of other equipments, for the packet transmission destination identification code of the communication equipments having the read identification code (302). Packet transmitting section 11 overwrites the packet transmission destination identification code of the received packet with the packet transmission destination identification code obtained from the section 13 for managing information of other equipments (304), and overwrites the packet transmission destination identification code of the received packet with the identification code of itself (306). Packet transmitting section 11 transfers the packet number stored in the header to the auxiliary data of the packet, and overwrites the packet number of the header with the serial number of the packet it has transmitted (308). The packet updated in this manner is applied to wireless transmitting section 14 (310).

Figure 22:
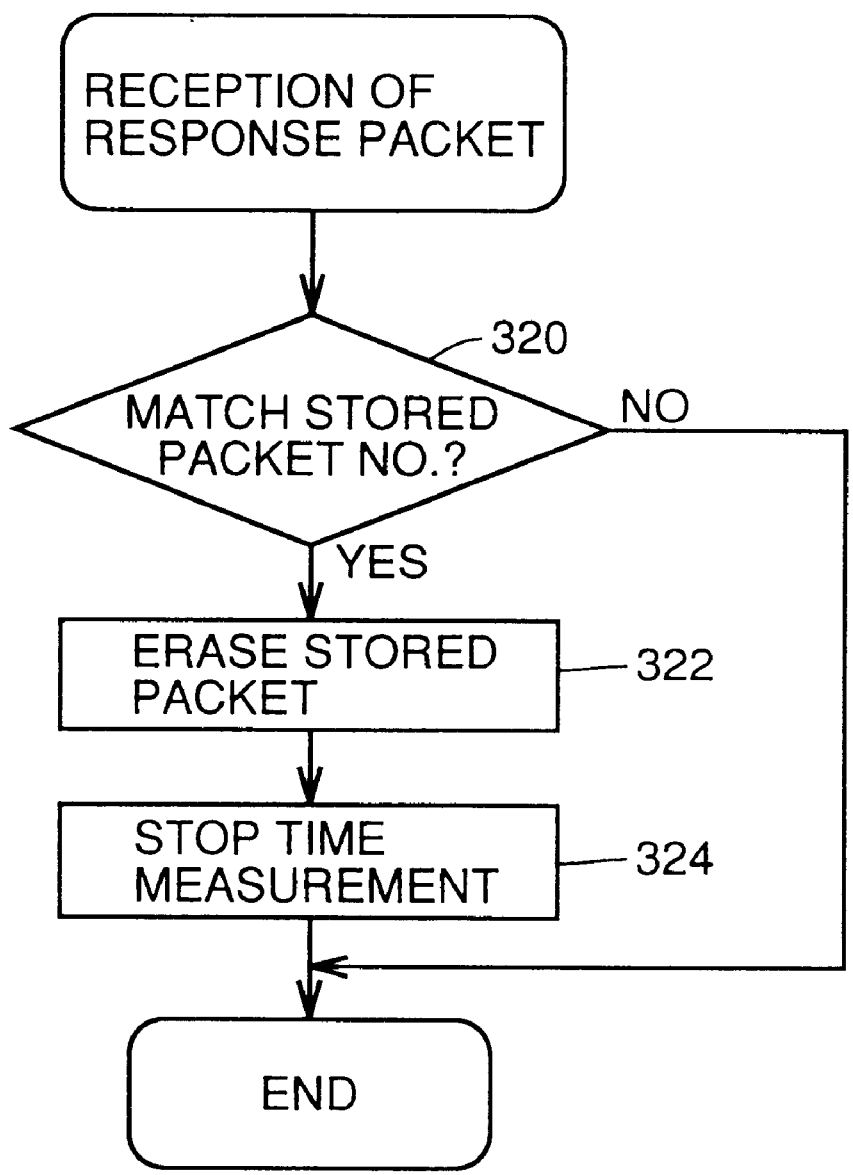
FIG. 22 is a flow chart of a process at a packet transmitting section when a notification that a reception response packet is received, is received.

Referring to FIG. 16, when there is a notification that the reception response packet is received, from packet receiving section 12, packet transmitting section 11 performs the response packet receiving process shown in FIG. 22. Referring to FIG. 22, first, whether or not the packet number applied from packet receiving section 12 matches the packet number of the packet it stores is determined (320). If the applied packet number matches the packet number of the stored packet, packet transmitting section 11 erases the stored packet (322), stop measurement of elapsed time for determining whether or not the reception response is within a prescribed time period (324), and the process is thus completed.

Figure 23:
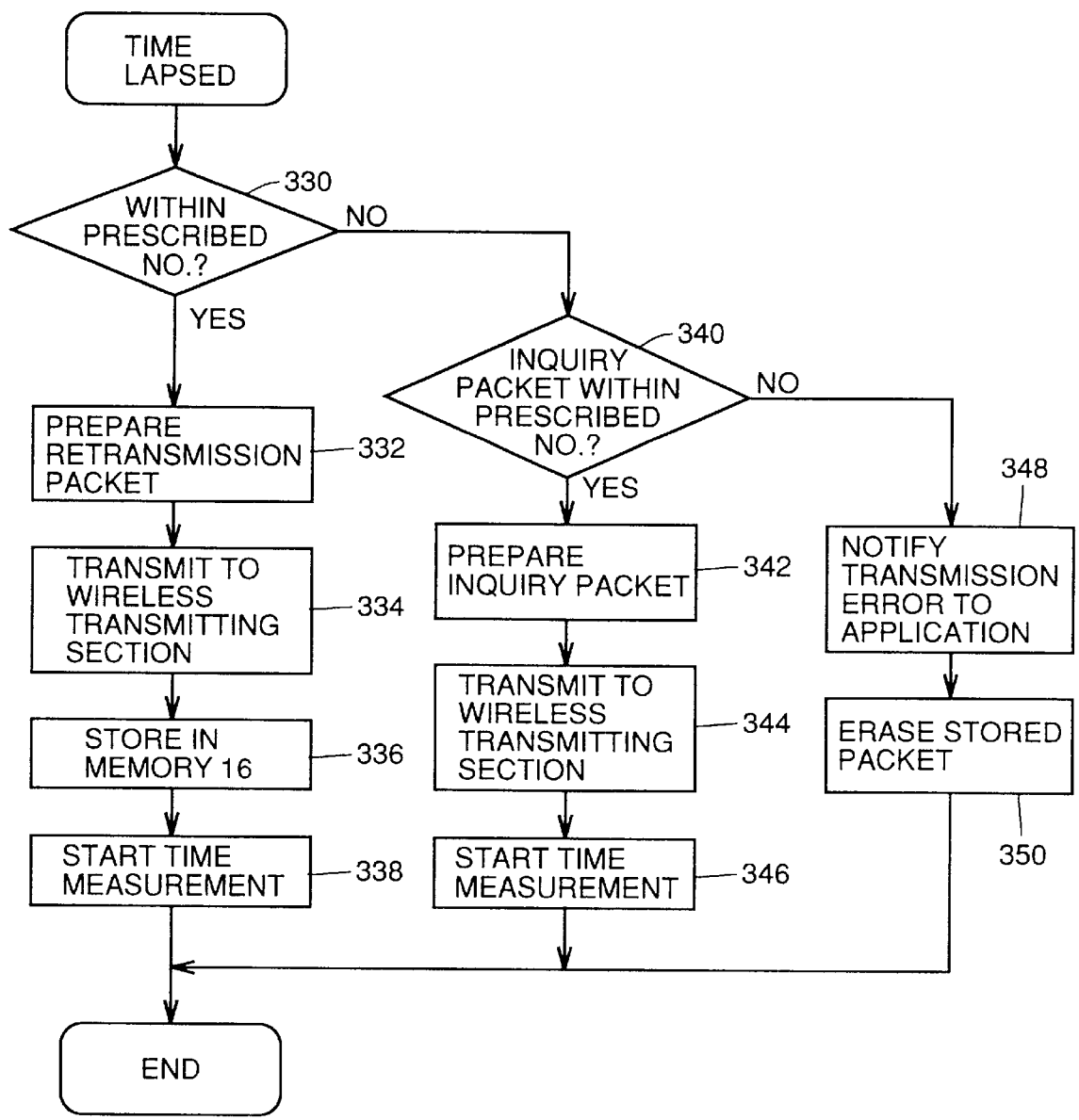
FIG. 23 is a flow chart of a process when a prescribed time period has passed without receiving a reception response packet.

Referring to FIG. 16, when prescribed time period passes without receiving the reception response packet after the transmission of the packet, packet transmitting section 11 performs the process shown in FIG. 23. Referring to FIG. 23, packet transmitting section 11 determines whether or not retransmission of data is within a prescribed number of times (330). If retransmission of data is within prescribed number of times, packet transmitting section 11 prepares a retransmission packet (332). More specifically, packet transmitting section 11 reads the packet at the first transmission of the data from memory 16, and transfers the packet number to the auxiliary data of the retransmission packet. Thereafter, packet transmitting section 11 updates the packet number in the head of the read packet to the latest serial number of the packet transmitted from itself. Further, packet transmitting section 11 obtains from the section 13 for managing information of other equipments, the packet transmission destination identification code for the communication equipment of the data transmission destination at that time, and writes the code in the packet transmission destination identification code of the header. In this manner, a retransmission packet having the same data as the packet of the data transmitted earlier and including a first transmission packet number in the auxiliary data is prepared. Packet transmitting section 11 sends thus prepared retransmitting packet to wireless transmitting section 14 (334), and stores it in the memory 16 (336). Further, packet transmitting section 11 starts time measuring for checking whether notification of a reception response is received from packet receiving section 12 within a prescribed time period (338), and thus the process is completed.

Meanwhile, if it is determined that retransmission of data has been repeated a prescribed number of times (330), packet transmitting section 11 performs inquiry packet transmitting process. First, whether or not the number of transmission of the inquiry packet is within a prescribed number of times is determined (340). If the number of transmission of the inquiry packet is within a prescribed number, packet transmitting section 11 prepares an inquiry packet (342) and applies it to wireless transmitting section 14 (344). Further, in order to check whether an answer packet to this packet is received within a prescribed time period, packet transmitting section 11 starts time measuring (346), and the process is completed.

If it is determined in step 340 that the number of transmission of the inquiry packet has been repeated a prescribed number of times, packet transmitting section 11 notifies that the transmission was failed to the application (348), erases the stored packet (350) and completes the process. By the process shown in FIG. 23, if a reception response packet is not received within a prescribed time period after the transmission of the packet, retransmission packet is transmitted prescribed number of times, and if nevertheless the reception response packet is still not received, an inquiry packet is transmitted. If an answer packet is not obtained to the inquiry packet, the retransmission packet is transmitted a prescribe number of times, and similar operation is repeated. After the process is repeated and the inquiry packet is transmitted prescribed times and still neither a reception response packet nor an answer packet is received, it is determined that the transmission was unsuccessful. Since the retransmission packets and inquiry packets are transmitted repeatedly until a reception response packet or an answer packet is received, it is highly possible to find that direct transmission becomes possible and to find a wireless communication equipment which can serve as a relay, and hence reliability of communication can be improved.

Figure 24:
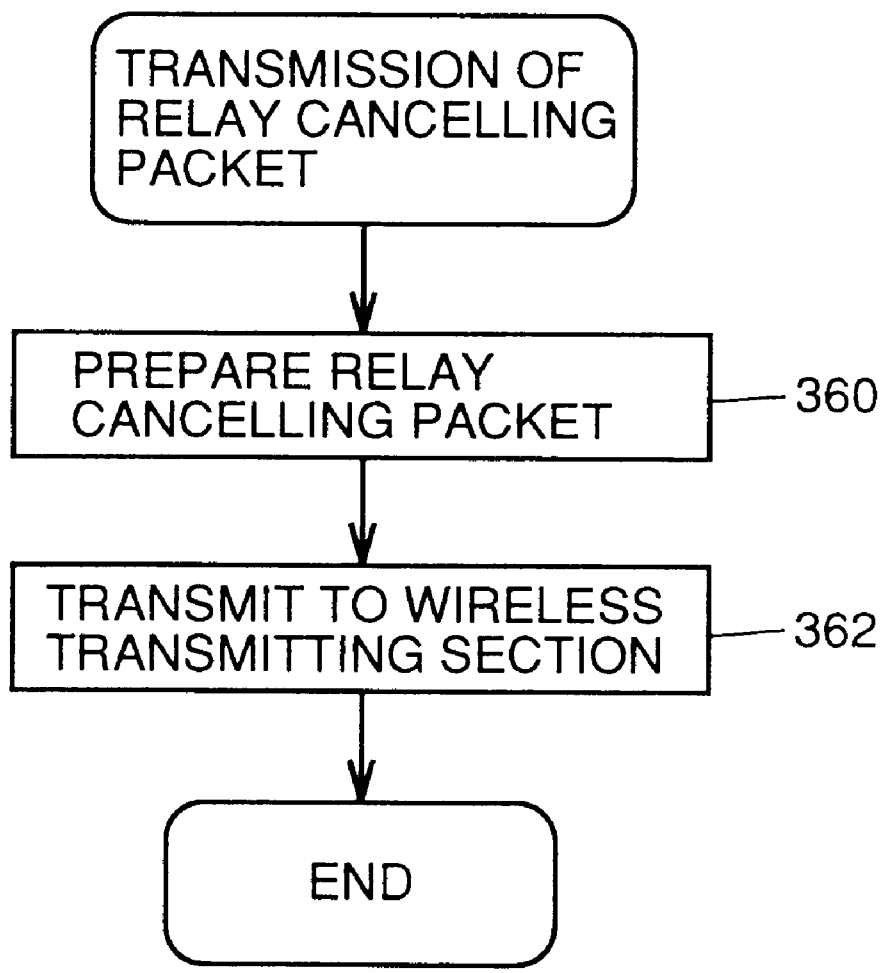
FIG. 24 is a flow chart of a relay cancelling packet transmitting process.

Referring to FIG. 16, when there is a command from packet receiving section 12 to transmits a relay cancelling packet (238), packet transmitting section 11 performs the process such as shown in FIG. 24. Referring to FIG. 24, in response to the transmission command, packet transmitting section 11 prepares a relay cancelling packet having an identification code applied from packet receiving section 12 as the data transmission destination identification code (360), and transmits it to wireless transmitting section 14 (362). The process corresponding to the transmission command of relay cancelling packet is completed.

It has been assumed that the wireless communication equipments are mobile in the foregoing description. However, any of these wireless communication equipments may be used fixed, without presenting any problem. It goes without saying that the wireless communication equipment may be used in such a system in that all the wireless communication equipments move together with the users. Further, the wireless communication equipment in accordance with the present invention does not necessarily be a simple wireless communication equipment, and it may have another function, for example a function of an electronic organizer. The wireless communication equipment in accordance with the present invention is capable of automatic switching between direct transmission and relayed transmission, in accordance with the communication condition. Therefore, efficiency of communication can be maintained high even when it is applied to mobile portable equipment for which condition of communication tends to vary.

In the communication system utilizing the wireless communication equipments described in the embodiment above, a plurality of data paths can be dynamically set between a pair of communication equipments, and hence efficiency in communication is high. Especially when direct transmission from a transmission source equipment to a transmission destination equipment is possible, data can be transmitted by direct transmission, and hence efficiency of communication is the highest. If direct transmission is not possible, though the efficiency is somewhat sacrificed, data can be transmitted through a relay to a desired transmission destination equipment by two or more direct transmission paths through one or more relay. Data can be transmitted quickly by effectively utilizing available source in the system, without the necessity to wait for the recovery of direct transmission. When a transmission destination equipment to which data has been transmitted through a relay enters a state allowing direct reception of the packet to be relayed, transmission is automatically switched from relayed to direct. Therefore, communication is always possible with highest efficiency.

Data can be transmitted through a relay even to a communication equipment to which wireless output cannot reach; therefore, there is less restriction imposed on the location of the communication equipments. Especially, the distance between communication equipments tend to vary among portable communication equipments, and presence/absence of an obstacle preventing transmission of wireless signal tends to vary. Therefore, whether direct transmission is possible or not changes considerably. However, since the communication system in accordance with the present invention utilizes both direct transmission and relayed transmission, data transmission is successful with high probability.

Further, each communication equipment holds information indicating whether direct transmission with other equipments is possible or not, and carries out data transmission in accordance with the information. When direct transmission is not possible, attempt of direct transmission in vain can be avoided, and high efficiency in communication is obtained. The information can be updated at every attempt of direct transmission. Therefore, highly reliable information can be held in all the communication equipments, the possibility of successful data transmission becomes higher and the communication efficiency of the overall system can be maintained high.

Every time direct transmission becomes impossible, an inquiry packet and an answer packet are used for selecting a relay. Therefore, path for relayed transmission is not fixed. Since the relayed transmission path can be arbitrarily changed at each time point in accordance with the overall communication system condition, possibility of successful data transmission is high. This is especially effective in a system including portable communication equipment of which position changes much.

In the packet used in the above described system, the data transmission destination and transmission source are clearly distinguished from packet transmission destination and transmission source. By this configuration, when communication is performed using the packet, each communication equipment can easily determine whether or not the packet includes data destined to it, whether the received packet is destined to it, and so on. In accordance with the result, any communication equipment can easily determine whether the processes for transferring the packet to another wireless communication equipment, for example, is necessary. Therefore, any of the communication equipments can function as a relay, and it is highly possible that there is an available relay even when the system condition changes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A wireless communication equipment used in a communication system including a plurality of such wireless communication equipment, where said plurality of wireless commmunication equipment are allotted with unique identification codes respectively in advance, said wireless communication equipment comprising:

transmission destination information managing means for managing transmission destination information for specifying actual transmission destination wireless communication equipment at the time of transmission to other said wireless communication equipments, transmitting/receiving means for transmitting to/receiving from other wireless communication equipments information of associated application and information for managing switching between direct transmission and relayed transmission with other wireless communication equipments, based on transmission destination information managed by said transmission destination information managing means;

wherein said transmission destination information managing means manages dynamically said transmission destination information in cooperation with said transmitting/receiving means;

wherein said transmission destination information managing means includes:

transmission destination information storing means for holding identification codes of other wireless communication equipments and respective identification codes of actual transmission destination wireless communication equipments when information is to be transmitted to respective other wireless communication equipments, and updating means for dynamically updating the identification codes of said actual transmission destination wireless communication equipments within said transmission destination information storing means, based on information for managing switching between direct transmission and relayed transmission with other wireless communication equipments applied from said transmitting/receiving means;

wherein said transmitting/receiving means includes:

transmitting means for transmitting a signal referring to said transmission destination information storing means, receiving means for receiving signals from other said wireless communication equipment, first detecting means for detecting that direct transmission with a specific other wireless communication equipment using said transmitting/receiving means becomes impossible, inquiry signal transmitting means responsive to said first detecting means for transmitting an inquiry signal to other said wireless communication equipments, wherein said other wireless communication equipments each having a function of transmitting an answer signal to said wireless communication equipment when direct transmission with said specific other wireless communication equipment is possible, in response to the inquiry signal, and means responsive to said answer signal for applying an identification code of transmission source of said answer signal to said managing means; and wherein said updating means includes means for updating the identification code of the actual transmission destination when information is to be transmitted to said other specific wireless communication equipment in said transmission destination information storing means, with the transmission source identification code of said answer signal.

2. The wireless communication equipment according to claim 1, wherein said transmitting/receiving means further includes means for transmitting, when a signal destined to said wireless communication equipment is received from another said wireless communication equipment, a reception response signal to said another wireless communication equipment by using said transmitting means, and said first detecting means includes means for determining, when a reception response signal from a wireless communication equipment to which a signal has been directly transmitted by using said transmitting means is not received by said receiving means within a prescribed time period, that direct transmission of said signal by said transmitting means becomes impossible.

3. The wireless communication equipment according to claim 1, wherein said transmitting/receiving means further includes determining means responsive to reception of an inquiry signal related to a specific wireless communication equipment from another said wireless communication equipment, for determining whether direct transmission to said specific wireless communication equipment is possible by referring to said transmission destination storing means, and answering means for transmitting, when it is determined by said determining means that direct transmission with said specific wireless communication equipment is possible, an answer signal in response to received said inquiry signal to said another wireless communication equipment.

4. The wireless communication equipment according to claim 3, wherein the inquiry signal related to said specific wireless communication equipment includes a type code indicating that the signal is an inquiry signal, an identification code of said specific wireless communication equipment, and an identification code of the wireless communication equipment which is a transmission source of said inquiry signal.

5. The wireless communication equipment according to claim 4, wherein
said determining means includes
means responsive to said inquiry signal for looking up an identification code of actual transmission destination corresponding to the identification code of said specific wireless communication equipment, from said transmission destination information storing means, and
means for determining whether said identification code specifying the actual transmission destination looked up by said look up means matches the identification code of said specific wireless communication equipment.

6. The wireless communication equipment according to claim 1, wherein
the signal transmitting between said plurality of wireless communication equipments includes data, a data transmission source identification code, a data transmission destination identification code, a signal transmission source identification code indicating last transmission source of the signal and a signal transmission destination identification code indicating actual transmission destination of the signal,
said transmitting means transmits the identification code of said wireless communication equipment as the signal transmission source identification code of the signal to be transmitted, looks up and transmits the identification code of the wireless communication equipment corresponding to said data transmission destination identification code from said transmission destination information storing means, as the signal transmission destination identification code, and
said transmitting means further transmits, for a signal generated in said wireless communication equipment, the identification code of the data transmission destination as the data transmission destination identification code of the signal to be transmitted, and the identification code of said wireless communication equipment as the data transmission source identification code, respectively.

7. The wireless communication equipment according to claim 6, wherein
said transmitting/receiving means further includes
transfer means responsive to reception of a signal having the identification code of said wireless communication equipment as the signal transmission destination identification code and an identification code different from the identification code of said wireless communication equipment as the data transmission destination identification code from another wireless communication equipment, for transferring received said signal by using said transmitting means.

8. The wireless communication equipment according to claim 6, wherein
said transmitting/receiving means further includes
second detecting means for detecting that a signal to be transmitted from a first other wireless communication equipment to said wireless communication equipment through a second other wireless communication equipment can be directly received by said wireless communication equipment, and
means responsive to said second detecting means for transmitting a relay cancelling signal with respect to said wireless communication equipment, to said first other wireless communication equipment.

9. The wireless communication equipment according to claim 8, wherein
said second detecting means includes means for detecting reception of a signal having the identification code of said second other wireless communication equipment as the signal transmission destination identification code, and the identification code of said wireless communication equipment as the data transmission destination identification code.

10. The wireless communication equipment according to claim 6, wherein
said transmitting/receiving means further includes relay cancelling signal detecting means responsive to reception of a relay cancelling signal with respect to another wireless communication equipment from said another wireless communication equipment for applying the data destination source identification code of said relay canceling signal to said updating means, and
said updating means further includes means for updating, when said data transmission source identification code is received from said relay cancelling signal detecting means, said transmission destination information storing means such that the actual signal transmission destination identification code for said another wireless communication equipments specified by the data transmission destination identification code of said relay cancelling signal is the data transmission source identification from said relay canceling signal detecting means.

11. The wireless communication equipment according to claim 1, wherein
said transmitting/receiving means further includes
means for repeating transmission of the inquiry signal by said inquiry signal transmitting means and direct transmission of the signal by said transmission means, until an answer signal or a reception response signal is received.

12. A wireless communication equipment used in a communication system including a plurality of such wireless communication equipment, where said plurality of wireless commmunication equipment are allotted with unique identification codes respectively in advance, said wireless communication equipment comprising:
transmission destination information managing means for managing transmission destination information for specifying actual transmission destination wireless communication equipment at the time of transmission to other said wireless communication equipments;
transmitting/receiving means for transmitting to/receiving from other wireless communication equipments information of associated application and information for managing switching between direct transmission and relayed transmission with other wireless communication equipments, based on transmission destination information managed by said transmission destination information managing means;
wherein said transmission destination information managing means manages dynamically said transmission destination information in cooperation with said transmitting/receiving means,
wherein said transmitting/receiving means performs communications using a packet;
wherein said transmission destination information managing means includes:
transmission destination information storing means for holding identification codes of other wireless communication equipments and respective identification codes of respective actual transmission destination wireless communication equipments when information is to be transmitted to respective other wireless communication equipments, and updating means for updating dynamically the identification codes of said actual transmission destination wireless communication equipments in said transmission destination information storing means, in cooperation with said transmitting/receiving means;

wherein said transmitting/receiving means includes:
transmitting means for transmitting a packet referring to said transmission destination information storing means, receiving means for receiving the packet, first detecting means for detecting that direct transmission with another specific wireless communication equipment using said transmitting/receiving means becomes impossible, inquiry packet transmitting means responsive to said first detecting means for transmitting an inquiry packet related to said another specific wireless communication equipment to other wireless communication equipments, wherein said other wireless communication equipments each having a function of transmitting an answer packet to said wireless communication equipment when direct transmission with said another specific wireless communication equipment is possible in response to the inquiry packet, and means responsive to said answer packet for applying an identification code of a transmission source of said answer packet to said managing means; and wherein said updating means includes means for updating the identification code of actual transmission destination when information is to be transmitted to said another specific wireless communication equipment, in said transmission destination information storing means, with the transmission source identification code of said answer packet.

13. The wireless communication equipment according to claim 12, wherein said transmitting/receiving means further includes means for transmitting, when a packet destined to said wireless communication equipment is received from another wireless communication equipment, a reception response packet to said another wireless communication equipment by using said transmission means, and said first detecting means includes means for determining, when a reception response packet from a wireless communication equipment to which a packet is directly transmitted by using said transmitting means is not received by said receiving means within a prescribed time period, that direct transmission of said packet by said transmitting means becomes impossible.

14. The wireless communication equipment according to claim 12, wherein said transmitting/receiving means further includes
determining means responsive to reception of an inquiry packet related to a specific wireless communication equipment from another wireless communication equipment, for determining whether nor not direct transmission to said specific wireless communication equipment is possible, by referring to said transmission destination information storing means, and answering means for transmitting, when it is determined by said determining means that direct transmission with said specific wireless communication equipment is possible, an answer packet in response to received said inquiry packet to said other wireless communication equipment.

15. The wireless communication equipment according to claim 14, wherein the inquiry packet related to said specific wireless communication equipment includes
a type code indicating that the packet is an inquiry packet,
an identification code of said specific wireless communication equipment, and
an identification code of wireless communication equipment which is the transmission source of said inquiry packet.

16. The wireless communication equipment according to claim 15, wherein said determining means includes
means responsive to said inquiry packet for looking up an identification code of an actual transmission destination corresponding to the identification code of said specific wireless communication equipment, from said transmission destination information storing means, and
means for determining whether said identification code specifying the actual transmission destination looked up by said look up means matches the identification code of said specific wireless communication equipment.

17. The wireless communication system according to claim 12, wherein a packet transmitted between said plurality of wireless communication systems includes data, a data transmission source identification code, a data transmission destination identification code, a packet transmission source identification code indicating a last transmission source of the packet, and a packet transmission destination identification code indicating an actual transmission destination of the packet, said transmitting means transmits the identification code of said wireless communication system as the packet transmission source identification code of the packet to be transmitted, and looks up and transmits an identification code of a wireless communication equipment corresponding to said data transmission destination identification code from said transmission destination information storing means as the packet transmission destination identification code, and said transmitting means further transmits an identification code of data transmission destination as the data transmission destination identification code, and transmits the identification code of said wireless communication equipment as the data transmission source identification code, for a packet generated in said wireless communication equipment.

18. The wireless communication system according to claim 17, wherein said transmitting/receiving means further includes
transfer means responsive to reception of a packet having the identification code of said wireless communication equipment as the packet transmission destination identification code and an identification code different from the identification code of said wireless communication equipment as data transmission destination identification code from other wireless communication equipment, for transferring received said packet by using said transmitting means.

19. The wireless communication system according to claim 17, wherein
said transmitting/receiving means further includes
second detecting means for detecting that a packet to be transmitted to said wireless communication system from a first other wireless communication equipment through a second other wireless communication equipment can be directly received by said wireless communication equipment, and
means responsive to said second detecting means for transmitting a relay cancelling packet related to said wireless communication equipment, to said first other wireless communication equipment.

20. The wireless communication equipment according to claim 19, wherein
said second detecting means includes means for detecting reception of a packet having an identification code of said second other wireless communication equipments as a packet transmission destination identification code, and the identification code of said wireless communication equipment as the data transmission destination identification code.

21. The wireless communication equipment according to claim 17, wherein
said transmitting/receiving means further includes relay cancelling packet detecting means responsive to reception of a relay cancelling packet related to said another wireless communication equipment from said another wireless communication equipment, for applying the data transmission source identification code of received said relay cancelling packet to said updating means, and
said updating means further includes means for updating said transmission destination information storing means such that when said data transmission source identification code is received from said relay cancelling packet detecting means, the actual packet transmission destination identification code for the wireless communication equipment specified by the data transmission destination identification code of the received said relay cancelling packet is the data transmission source identification code from said relay cancelling packet detecting means.

22. The wireless communication equipment according to claim 12, wherein
said transmitting/receiving means further includes means for repeating transmission of the inquiry packets by said inquiry packet transmitting means and direct transmission of the packets by said transmitting means, until an answer packet or a reception response packet is received.

23. A wireless communication system including a plurality of wireless communications equipments, each of said plurality of wireless communications equipments performs wireless communication with each of said plurality of wireless commmunication equipments for associated application means, respectively, and where said plurality of wireless communication equipments are allotted with unique identification codes respectively in advance;
wherein each of said plurality of wireless communication equipments includes:
transmission destination information managing means for managing transmission destination information specifying actual transmission destination wireless communication equipment when performing transmission to other wireless communication equipments,
transmitting/receiving means for transmitting/receiving information for said application means and information for managing switching between direct transmission and relayed transmission with other wireless communication equipments, to and from other wireless communication equipments based on the transmission destination information managed by said transmission destination information managing means, and
wherein said transmission destination information managing means dynamically managing said transmission destination information in cooperation with said transmitting/receiving means;
wherein said transmission destination information managing means of each of said plurality of wireless communication equipments includes:
transmission destination information storing means for holding identification code of other wireless communication equipments and respective identification codes of actual transmission destination wireless communication equipments when information is to be transmitted to respective other wireless communication equipments, and
updating means for updating dynamically the identification codes of said actual transmission destination wireless communication equipments in said transmission destination information storing means, based on information for managing switching between direct transmission and relayed transmission with other wireless communication equipments;
wherein said transmitting/receiving means of each of said plurality of wireless communication equipments includes:
transmitting means for transmitting a signal referring to said transmission destination information storing means,
receiving means for receiving signals from other said wireless communication system,
first detecting means for detecting that direct transmission with other specific wireless communication equipment by using said transmitting/receiving means becomes impossible,
inquiry signal transmitting means responsive to said first detecting means for transmitting an inquiry signal related to said other specific wireless communication equipment to other wireless communication equipments,
wherein said other wireless communication equipments having a function of transmitting, in response to the inquiry signal, an answer signal to said wireless communication equipment when direct transmission with said other specific wireless communication equipment is possible, and
means responsive to said answer signal for applying an identification code of transmission source of said answer signal to said managing means; and
wherein said updating means includes means for updating an identification code of actual transmission destination when information is to be transmitted to said other specific wireless communication equipment, in said transmission destination information storing means with the transmission source identification code of said answer signal.

24. The wireless communication system according to claim 23, wherein
said transmitting/receiving means of each of said plurality of wireless communication equipments further includes
means for transmitting, when a signal destined to said wireless communication equipment is received from another wireless communication equipment, a reception response signal to said another wireless communication equipment by using said transmission means, and
said first detecting means of each of said plurality of wireless communication equipments includes means for determining, when said receiving means does not receive the reception response signal from a wireless communication equipment to which a signal is directly transmitted by using said transmitting means within a prescribed time period, that direct transmission of said signal by said transmitting means becomes impossible.

25. The wireless communication equipment according to claim 23, wherein
said transmitting/receiving means of each of said plurality of wireless communication equipments includes
determining means responsive to reception of an inquiry signal related to a specific wireless communication equipment from other wireless communication equipments, for determining whether direct transmission to said specific wireless communication equipment is possible by referring to said transmission destination information storing means, and
answering means for transmitting, when it is determined by said determining means that direct transmission with said specific wireless communication equipment is possible, for transmitting an answer signal in response to received said inquiry signal to said other wireless communication equipments.

26. The wireless communication system according to claim 25, wherein
the inquiry signal related to said specific wireless communication equipment includes
a type code indicating that the signal is an inquiry signal,
an identification code of said specific wireless communication equipment, and
an identification code of a transmission source wireless communication equipment of said inquiry signal.

27. The wireless communication system according to claim 26, wherein
said determining means of each of said plurality of wireless communication equipments includes
means responsive to said inquiry signal for looking up an actual transmission destination identification code corresponding to the identification code of said specific wireless communication equipment from said transmission destination information storing means, and
means for determining whether said identification code specifying the actual transmission destination looked up by said look up means matches the identification code of said specific wireless communication equipment.

28. The wireless communication system according to claim 23, wherein
a signal transmitted between said plurality of wireless communication equipments includes data, a data transmission source identification code, a data transmission destination identification code, a signal transmission source identification code indicating a last transmission source of the signal, and a signal transmission destination identification code indicating an actual transmission destination of the signal,
said transmitting means of each of said plurality of wireless communication equipments transmits said identification code of said wireless communication equipment as the signal transmission source identification code of the signal to be transmitted, and looks up and transmits an identification code of the wireless communication equipment corresponding to said data transmission destination identification code from said transmission destination information storing means, as the signal transmission destination identification code, and
said transmitting means of each of said plurality of wireless communication equipments transmits, for a signal generated in said wireless communication equipment, an identification code of the data transmission destination as the data transmission destination identification code of the signal to be transmitted, and the identification code of said wireless communication equipment as said data transmission source identification code.

29. The wireless communication equipment according to claim 28, wherein
said transmitting/receiving means of each of said plurality of wireless communication equipments further includes
transfer means responsive to reception of a signal having the identification code of said wireless communication equipment as the signal transmission destination identification code and an identification code different from the identification code of said wireless communication equipment as data transmission destination identification code, from other wireless communication equipment, for transferring received said signal by using said transmitting means.

30. The wireless communication equipment, according to claim 28, wherein
said transmitting/receiving means of each of said plurality of wireless communication equipments includes
second detecting means for detecting that a signal to be transmitted to said wireless communication equipment from a first other wireless communication equipment to a second other wireless communication equipment can be received directly by said wireless communication equipment, and
means responsive to said second detecting means for transmitting a relay cancelling signal related to said wireless communication equipment to said first other wireless communication equipment.

31. The wireless communication system according to claim 30, wherein
said second detecting means of each of said plurality of wireless communication equipments includes means for detecting reception of a signal having an identification code of said second other wireless communication equipment as a signal transmission destination identification code, and the identification code of said wireless communication equipment as the data transmission destination identification code.

32. The wireless communication system according to claim 28, wherein
said transmitting/receiving means of each of said plurality of wireless communication equipments include relay cancelling signal detecting means responsive to reception of a relay cancelling signal related to another wireless communication equipments from said another wireless communication equipment, for applying the data transmission source identification code of said relay cancelling signal to said updating means, and said updating means of each of said plurality of wireless communication equipments includes means for updating, when said data transmission source identification code is received by said relay cancelling signal detecting means, said transmission destination information storing means such that the actual signal transmission destination identification code for said another wireless communication equipments specified by the data transmission destination identification code of said relay cancelling signal is the data transmission source identification code from said relay cancelling signal detecting means.

33. The wireless communication equipment according to claim 23, wherein said transmitting/receiving means of each of said plurality of wireless communication equipments includes means for repeating transmission of an inquiry signal by said inquiry signal transmitting means and direct transmission of a signal by said transmitting means until an answer signal or a reception response signal is received.

34. A wireless communication system including a plurality of wireless communications equipments, each of said plurality of wireless communications equipments performs wireless communication with each of said plurality of wireless commmunication equipments for associated application means, respectively, and where said plurality of wireless communication equipments are allotted with unique identification codes respectively in advance;

wherein each of said plurality of wireless communication equipments includes:

transmission destination information managing means for managing transmission destination information specifying actual transmission destination wireless communication equipment when performing transmission to other wireless communication equipments, transmitting/receiving means for transmitting/receiving information for said application means and information for managing switching between direct transmission and relayed transmission with other wireless communication equipments, to and from other wireless communication equipments based on the transmission destination information managed by said transmission destination information managing means, wherein said transmission destination information managing means dynamically managing said transmission destination information in cooperation with said transmitting/receiving means, and wherein said transmitting/receiving means performs communication by using a packet;

wherein said transmission information managing means of each of said plurality of wireless communication equipment includes:

transmission destination information storing means for holding identification codes of other wireless communication equipments and respective identification codes of actual transmission destination wireless communication equipments when information is to be transmitted to respective other wireless communication equipments, and updating means for updating dynamically the identification codes of said actual transmission destination wireless communication equipments in said transmission destination information storing means, in cooperation with said transmitting/receiving means;

wherein said transmitting/receiving means of each of said plurality of wireless communication equipments includes:

transmitting means for transmitting a packet by referring to said transmission destination information storing means, receiving means for receiving the packet, first detecting means for detecting that direct transmission with another specific wireless communication equipment using said transmitting/receiving means becomes impossible, inquiry packet transmitting means responsive to said first detecting means for transmitting an inquiry packet related to said another specific wireless communication equipment to other wireless communication equipments, wherein said other wireless communication equipments having a function of transmitting, responsive to an inquiry packet, an answer packet to said wireless communication equipment when direct transmission with said another specific wireless communication equipment is possible, and means responsive to said answer packet for applying an identification code of transmission source of said answer packet to said managing means; and wherein said updating means of each of said plurality of wireless communication equipments includes means for updating the identification code of actual transmission destination when information is to be transmitted to said another specific wireless communication equipment, in said transmission destination information storing means, with transmission source identification code of said answer packet.

35. The wireless communication system according to claim 34, wherein said transmitting/receiving means of each of said plurality of wireless communication equipments further includes means for transmitting, when a packet destined to said wireless communication equipment is received from another wireless communication equipment, for transmitting a reception response packet to said another wireless communication equipment by using said transmitting means, and said first detecting means of each of said plurality of wireless communication equipments includes means for determining, when a reception response packet from the wireless communication equipment to which the packet has been directly transmitted by using said transmitting means is not received by said receiving means within a prescribed time period, that direct transmission of said packet by said transmitting means becomes impossible.

36. The wireless communication equipment according to claim 34, wherein said transmitting/receiving means of each of said plurality of wireless communication equipments includes determining means responsive to reception of an inquiry packet related to a specific wireless communication equipment from another wireless communication equipment, for determining whether or not direct transmission to said specific wireless communication equipment is possible by referring to said transmission destination information storing means, and answering means for transmitting, when it is determined by said determining means that direct transmission to said specific wireless communication equipment is possible, an answer packet in response to received said inquiry packet to said another wireless communication equipment.

37. The wireless communication system according to claim 36, wherein the inquiry packet related to said specific wireless communication equipment includes
a type code indicating that the packet is an inquiry packet,
an identification code of said specific wireless communication equipment, and
an identification code of a transmission source wireless communication equipment of said inquiry packet.

38. The wireless communication equipment according to claim 37, wherein said determining means of each of said plurality of wireless communication equipments includes
means responsive to said inquiry packet for looking up an identification code of an actual transmission destination corresponding to the identification code of said specific wireless communication equipment from said transmission destination information storing means, and
means for determining whether said identification code specifying the actual transmission destination looked up by said look up means matches the identification code of said specific wireless communication equipment.

39. The wireless communication system according to claim 34, wherein a packet transmitted between said plurality of wireless communication equipments includes data, a data transmission source identification code, a data transmission destination identification code, a packet transmission source identification code indicating a last transmission source of the packet, and a packet transmission destination identification code indicating an actual transmission destination of the packet, said transmitting means of each of said plurality of wireless communication equipments transmits the identification code of said wireless communication equipment as the packet transmission source identification code of a packet to be transmitted, and looks up and transmits the identification code of the wireless communication equipment corresponding to said data transmission destination identification code from said transmission destination information storing means, as the packet transmission destination identification code, and said transmitting means of said plurality of wireless communication equipments transmits, for a packet generated in said wireless communication equipments, the identification code of the data transmission destination as data transmission destination identification code, and the respective identification code of said wireless communication equipments as the data transmission source identification code.

40. The wireless communication system according to claim 39, wherein said transmitting/receiving means of each of said plurality of wireless communication equipments further includes transfer means responsive to reception of a packet having the identification code of said wireless communication equipments as the packet transmission destination identification code and an identification code different from the identification code of said wireless communication equipments as the data transmission destination identification code, for transferring received said packet by using said transmitting means.

41. The wireless communication system according to claim 39, wherein said transmitting/receiving means of each of said plurality of wireless communication equipments includes
second detecting means for detecting that a packet to be transmitted to said wireless communication equipment from a first other wireless communication equipment through a second other wireless communication equipments can be directly received by said wireless communication equipment, and
means responsive to said second detecting means for transmitting a relay cancelling packet related to said wireless communication equipment, to said first other wireless communication equipment.

42. The wireless communication system according to claim 41, wherein said detecting means of each of said plurality of wireless communication equipment includes means for detecting reception of a packet having an identification code of said second other wireless communication equipment as the packet transmission destination identification code and the identification code of said wireless communication equipment as the data transmission destination identification code.

43. The wireless communication system according to claim 39, wherein said transmitting/receiving means of each of said plurality of wireless communication equipments includes a relay cancelling packet detecting means responsive to reception of a relay cancelling packet related to another wireless communication equipments from said another wireless communication equipment, for applying the data transmission source identification code of received said relay cancelling packet to said updating means, and said updating means further includes means for updating, when said data transmission source identification code is received from said relay cancelling packet detecting means, said transmission destination information storing means such that the actual packet transmission destination identification code of the wireless communication equipment specified by the data transmission destination identification code of received said relay cancelling packet is the data transmission source identification code from said relay cancelling packet detecting means.

44. The wireless communication system according to claim 34, wherein said transmitting/receiving means of each of said plurality of wireless communication equipments further includes means for repeating transmission of an inquiry packet by said inquiry packet transmitting means and direct transmission of the packet by said transmitting means until an answer packet or a reception response packet is received.

* * * * *